(12) United States Patent
Park et al.

(10) Patent No.: US 10,250,842 B2
(45) Date of Patent: Apr. 2, 2019

(54) ELECTRONIC DEVICE AND METHOD OF CONTROLLING THE SAME

(71) Applicant: SAMSUNG ELECTRONICS CO., LTD., Suwon-si, Gyeonggi-do (KR)

(72) Inventors: Il-kwon Park, Suwon-si (KR); Hyeong-chan Seo, Suwon-si (KR); Sung-ki Jin, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 97 days.

(21) Appl. No.: 15/360,055

(22) Filed: Nov. 23, 2016

(65) Prior Publication Data

US 2017/0187981 A1 Jun. 29, 2017

(30) Foreign Application Priority Data

Dec. 24, 2015 (KR) .................. 10-2015-0186783

(51) Int. Cl.
| | | |
|---|---|---|
| *H04N 5/77* | (2006.01) | |
| *H04N 5/225* | (2006.01) | |
| *H04N 5/232* | (2006.01) | |
| *H04N 5/376* | (2011.01) | |
| *H04N 5/378* | (2011.01) | |

(52) U.S. Cl.
CPC ............ *H04N 5/77* (2013.01); *H04N 5/2258* (2013.01); *H04N 5/23238* (2013.01); *H04N 5/378* (2013.01); *H04N 5/3765* (2013.01)

(58) Field of Classification Search
CPC .................................................. H04N 5/2258
See application file for complete search history.

(56) References Cited

U.S. PATENT DOCUMENTS

| | | | | |
|---|---|---|---|---|
| 5,604,534 A | * | 2/1997 | Hedges | G01C 11/025 348/106 |
| 2007/0206945 A1 | * | 9/2007 | DeLorme | G03B 41/00 396/332 |
| 2008/0024614 A1 | | 1/2008 | Li et al. | |
| 2009/0284637 A1 | * | 11/2009 | Parulski | H04N 1/00183 348/333.12 |
| 2010/0097443 A1 | * | 4/2010 | Lablans | G03B 37/00 348/36 |
| 2010/0097444 A1 | * | 4/2010 | Lablans | G03B 35/00 348/46 |
| 2011/0242342 A1 | | 10/2011 | Goma et al. | |
| 2012/0120186 A1 | | 5/2012 | Diaz et al. | |

(Continued)

FOREIGN PATENT DOCUMENTS

| | | |
|---|---|---|
| JP | 2013-214952 | 10/2013 |
| KR | 10-2009-0072556 | 7/2009 |
| KR | 10-2013-0028096 | 3/2013 |

OTHER PUBLICATIONS

Extended European Search Report issued in Appl. No. 16205986.9 dated May 22, 2017.

(Continued)

*Primary Examiner* — Eileen M Adams
(74) *Attorney, Agent, or Firm* — Nixon & Vanderhye P.C.

(57) ABSTRACT

An electronic device is provided, the electronic device is capable of optimizing and/or improving temporary memory capacity and efficiently configuring hardware by adjusting reading timings of data read from a plurality of imaging sensors.

18 Claims, 13 Drawing Sheets

(56) References Cited

U.S. PATENT DOCUMENTS

| 2012/0120256 A1* | 5/2012 | Hwang | G06T 1/20 |
| | | | 348/207.1 |
| 2013/0235149 A1* | 9/2013 | Tanaka | H04N 5/23238 |
| | | | 348/36 |
| 2014/0267816 A1 | 9/2014 | Baek | |

OTHER PUBLICATIONS

Search Report and Written Opinion dated Feb. 15, 2017 in counterpart International Patent Application No. PCT/KR2016/012617.

* cited by examiner

FIG. 1A
FIG. 1B
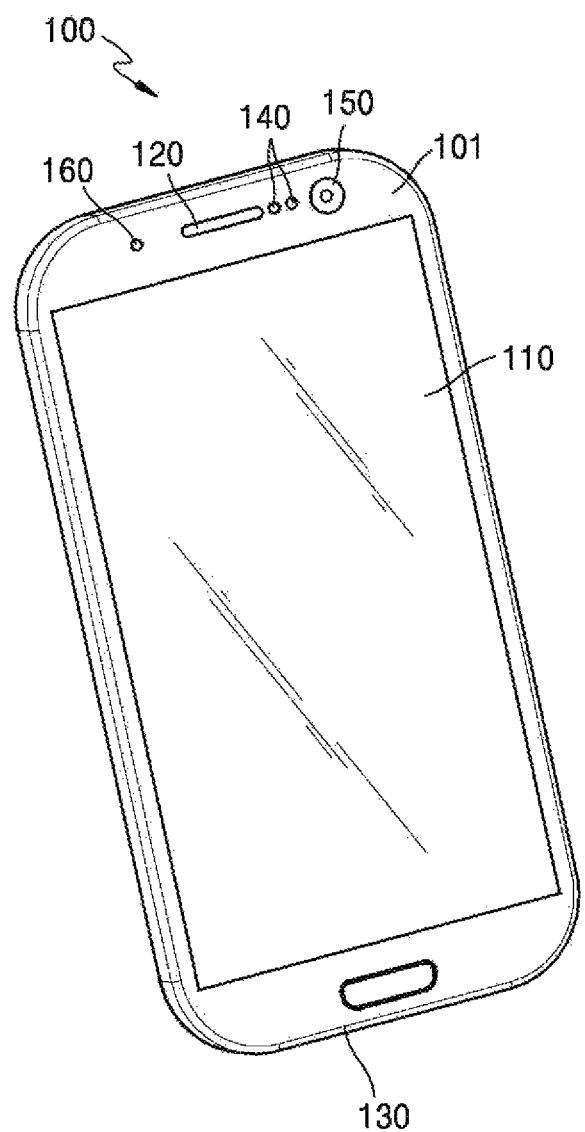
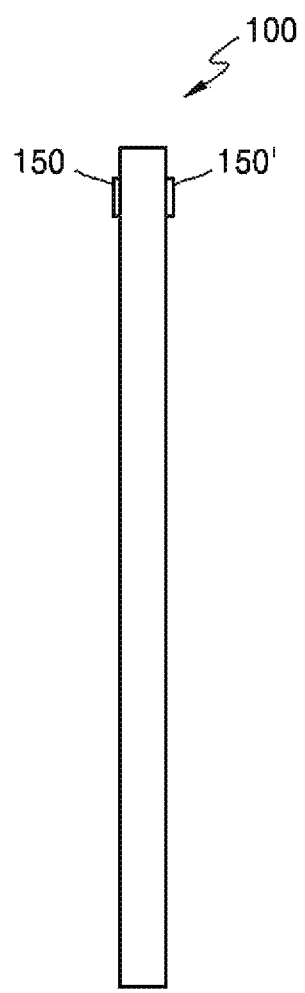

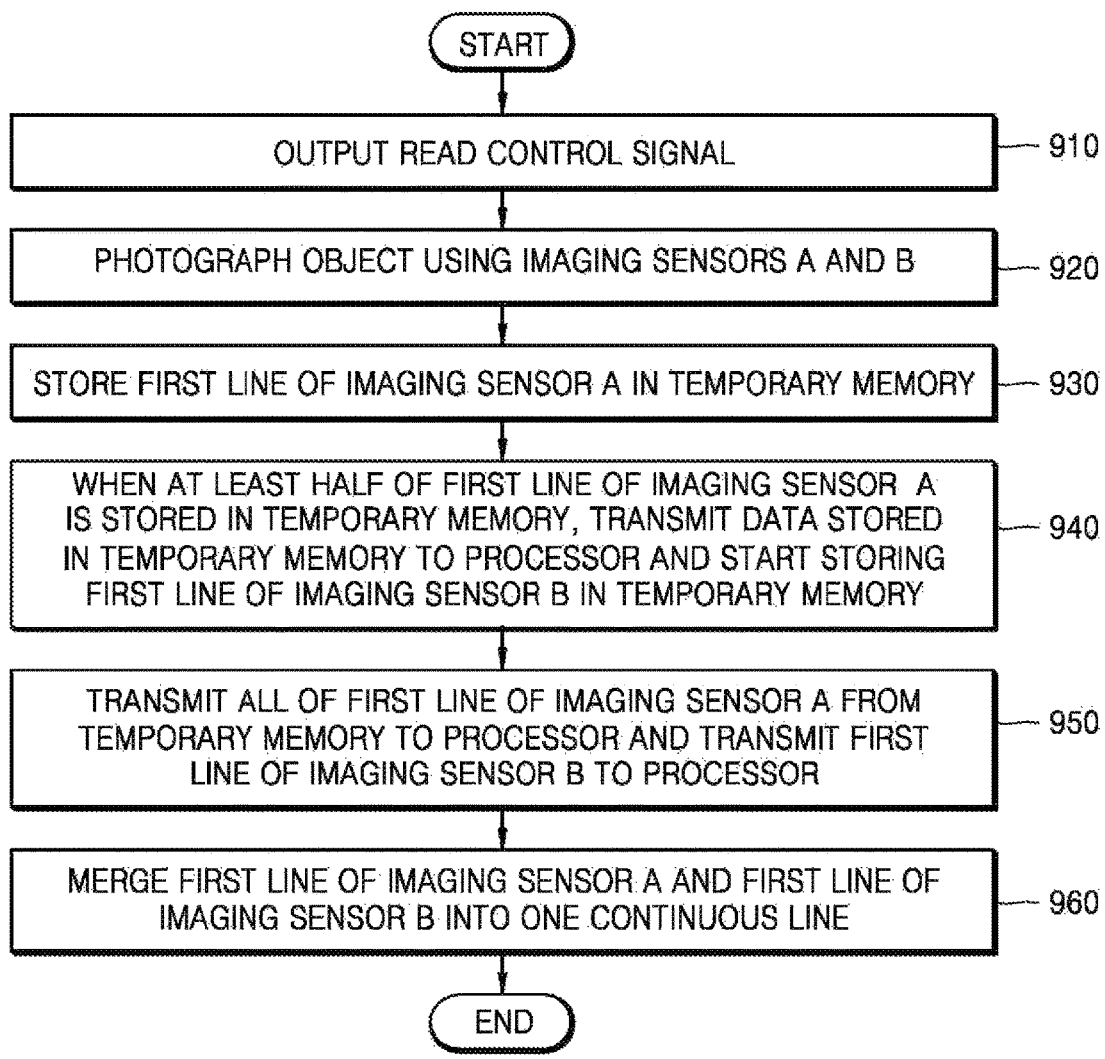

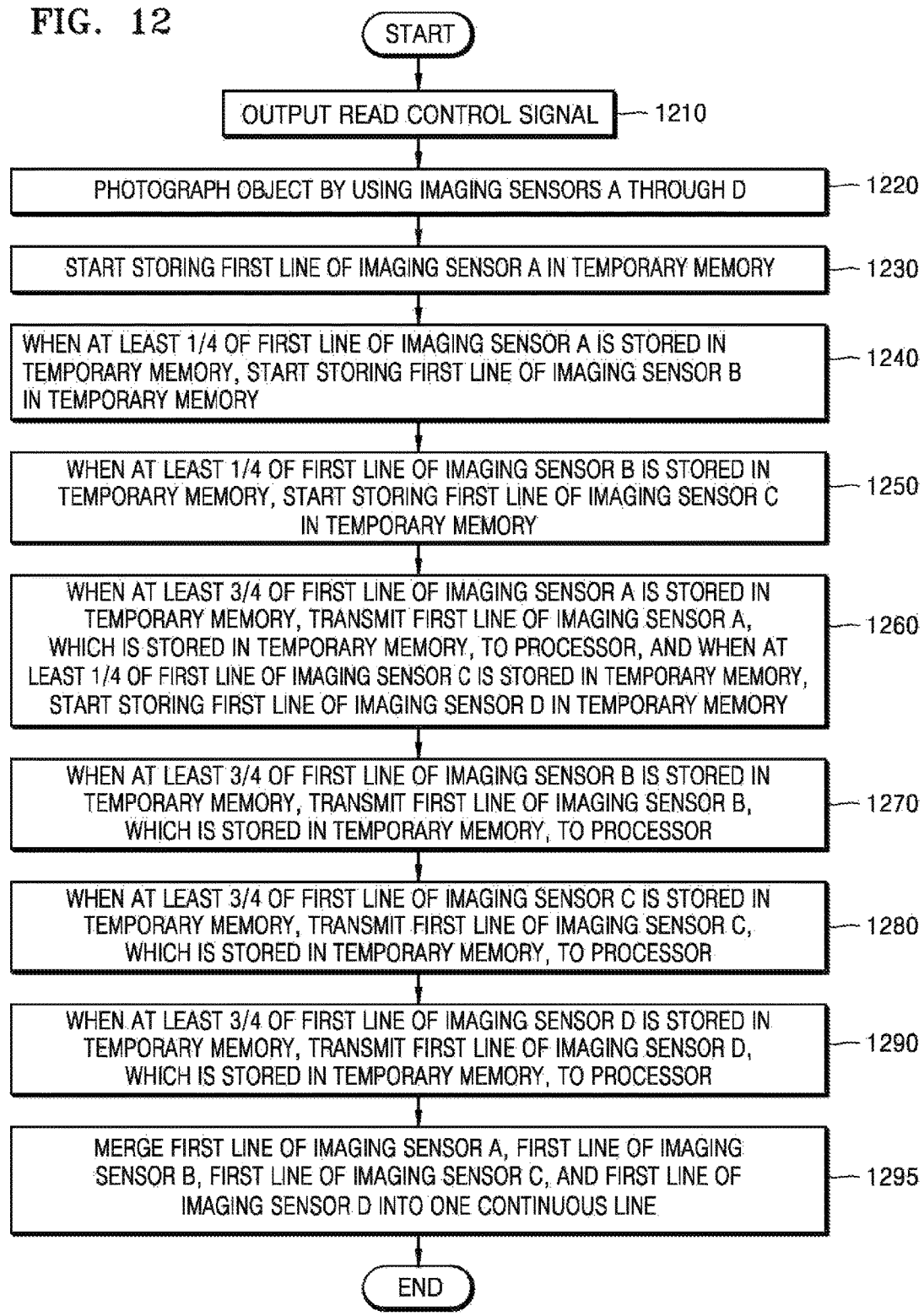

1310  1320  1330  1340

1350

ELECTRONIC DEVICE AND METHOD OF CONTROLLING THE SAME

CROSS-REFERENCE TO RELATED APPLICATION

This application is based on and claims priority under 35 U.S.C. § 119 to Korean Patent Application No. 10-2015-0186783, filed on Dec. 24, 2015, in the Korean Intellectual Property Office, the disclosure of which is incorporated by reference herein in its entirety.

BACKGROUND

1. Field

The present disclosure relates generally to electronic devices and methods of controlling the same, and for example, to an electronic device capable of varying reading timings of image signals generated by a plurality of imaging sensors, and a method of controlling the electronic device.

2. Description of Related Art

An electronic device may process an image obtained through an imaging sensor. Also, recently, mobile electronic devices have reached a functionality convergence stage and are capable of performing functions of other devices. An electronic device may provide a photographing function by including an image sensor, in addition to a phone call function and message transmitting and receiving functions.

The imaging sensor may perform a function of converting a received optical signal to an electrical signal through pixels. The pixels may be arranged in a pixel array having a set color pattern. For example, pixels of the imaging sensor may be red (R), green (G), and blue (B) pixels, wherein the R, G, and B pixels may be arranged in a pixel array of a set color pattern. Also, the pixels may be arranged in a pixel array of a color and brightness pattern. For example, the pixels of the imaging sensor may be R, G, B, and white (W) pixels, wherein the R, G, B, and W pixels may be arranged in a pixel array of a set pattern.

At least one imaging sensor may be provided in an electronic device. The electronic device may provide one image by composing images captured by two or more imaging sensors.

However, when photographing is performed using a plurality of imaging sensors, hardware of the electronic device is increased if a temporary memory or a processing circuit is used based on an amount of data read from each of the plurality of imaging sensors, which is respectively stored or processed by the temporary memory or processing circuit, and thus overall expenses are increased.

SUMMARY

An electronic device capable of optimizing and/or improving temporary memory capacity and efficiently configuring hardware by adjusting reading timings of data read from a plurality of imaging sensors, and a method of controlling the electronic device are provided.

Additional aspects will be set forth in part in the description which follows and, in part, will be apparent from the description.

According to an aspect of an example embodiment, an electronic device includes: a plurality of image sensors including a first imaging sensor and a second imaging sensor; and a processor electrically connected to the plurality of imaging sensors and configured to output a read control signal and a synchronization signal to the plurality of imaging sensors, wherein the processor is configured to: output a first read control signal to the first imaging sensor and store first data read from the first imaging sensor in a temporary memory, output a second read control signal to the second imaging sensor at a point of time later than the first read control signal and additionally store second data read from the second imaging sensor in the temporary memory, control a speed of outputting the first and second data stored in the temporary memory based on an output control signal said speed of outputting being faster than a speed of reading the first and second data from the first and second imaging sensors to the temporary memory based on the first and second read control signals, and generating merged data by merging the first data and the second data output from the temporary memory.

According to an aspect of another example embodiment, a method of controlling an electronic device including a plurality of image sensors comprising a first imaging sensor and a second imaging sensor, the method including: outputting a first read control signal to the first imaging sensor and storing first data read from the first imaging sensor in a temporary memory; outputting a second read control signal to the second imaging sensor at a point of time later than the first read control signal and storing second data read from the second imaging sensor in the temporary memory; controlling a speed of outputting the first data and the second data stored in the temporary memory based on an output control signal, the speed of outputting being faster than a speed of reading the first data and the second data from the first and second imaging sensors to the temporary memory based on the first and second read control signals; and generating merged data obtained by merging the first data and the second data output from the temporary memory.

According to an aspect of another example embodiment, a non-transitory computer-readable recording medium has recorded thereon a program, which when executed by a computer, performs a method of controlling an electronic device including a plurality of image sensors including a first imaging sensor and a second imaging sensor, the method including: outputting a first read control signal to the first imaging sensor and storing first data read from the first imaging sensor in a temporary memory; outputting a second read control signal to the second imaging sensor at a point of time later than the first read control signal and storing second data read from the second imaging sensor in the temporary memory; controlling a speed of outputting the first data and the second data stored in the temporary memory based on an output control signal, the speed of outputting being faster than a speed of reading the first data and the second data from the first and second imaging sensors to the temporary memory based on the first and second read control signals; and generating merged data obtained by merging the first data and the second data output from the temporary memory.

BRIEF DESCRIPTION OF THE DRAWINGS

These and/or other aspects will become apparent and more readily appreciated from the following detailed description, taken in conjunction with the accompanying drawings, in which like reference numerals refer to like elements, and wherein:

FIGS. 1A and 1B are diagrams illustrating an example outer shape of an electronic device according to an example embodiment;

FIG. 9 is a flowchart illustrating an example method of controlling an electronic device, according to an example embodiment;

FIG. 12 is a flowchart illustrating an example method of combining, by an electronic device, image signals generated by each of imaging sensors, when the electronic device includes four imaging sensors according to another example embodiment;

DETAILED DESCRIPTION

Figure 2:
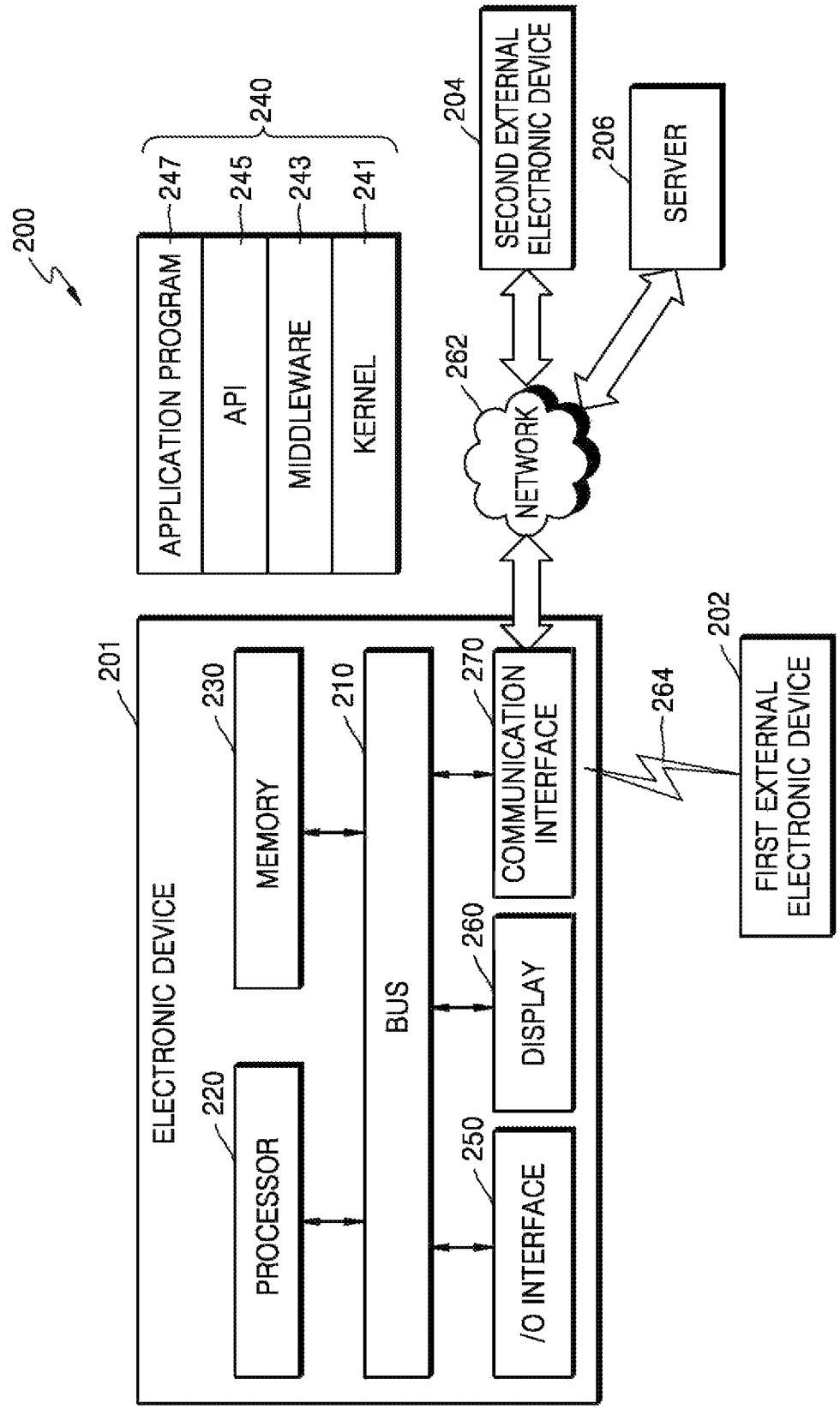
FIG. 2 is a block diagram illustrating an example electronic device in a network environment, according to some example embodiments.

Reference will now be made in greater detail to various example embodiments, examples of which are illustrated in the accompanying drawings, wherein like reference numerals refer to like elements throughout. In this regard, the present example embodiments may have different forms and should not be construed as being limited to the descriptions set forth herein. Accordingly, the example embodiments are merely described below, by referring to the figures, to explain various example aspects.

In the present disclosure, it is to be understood that terms such as "including," "having," etc., are intended to indicate the existence of the features (for example, numbers, operations, or components, such as parts), and are not intended to preclude the possibility that one or more other features may exist or may be added.

As used herein, the term "and/or" includes any and all combinations of one or more of the associated listed items. Expressions such as "at least one of," when preceding a list of elements, modify the entire list of elements and do not modify the individual elements of the list.

While such terms as "first", "second", etc., may be used to describe various components, such components must not be limited to the above terms. The above terms are used only to distinguish one component from another. For example, a first user device and a second user device may indicate different user devices regardless of an order or an importance. For example, a first component may be named a second component, and similarly, a second component may be named a first component without departing from the scope of the present disclosure.

When a component (first component) is "operatively or communicatively coupled with/to" or "connected to" another component (second component), the first component may be connected to the second component directly or through another component (third component). On the other hand, when the first component is "directly coupled with/to" or "directly connected to" the second component, no other component exists between the first and second components.

The expression "configured to (or set to)" used in the present disclosure may be replaced by, for example, "suitable for", "having the capacity to", "designed to", "adapted to", "made to", or "capable of", according to situations. The expression "configured to (or set to)" may not only necessarily mean "specifically designed to" in terms of hardware. Instead, in some situations, the expression "device configured to" may refer to the situation in which the device is "capable of" together with another device or parts. For example, the phrase "a processor configured to (or set to) perform A, B, and C" may refer, for example, to an exclusive processor (for example, an embedded processor) for performing A, B, and C, or a generic-purpose processor (for example, a central processing unit (CPU) or an application processor (AP)) for performing A, B, and C by executing at least one software program stored in a memory device.

The terms used in the present disclosure are merely used to describe various example embodiments, and are not intended to limit the present disclosure. An expression used in the singular encompasses the expression in the plural, unless it has a clearly different meaning in the context. Unless otherwise defined, all terms (including technical and scientific terms) used herein have the same meanings as commonly understood by one of ordinary skill in the art to which this disclosure belongs. It will be further understood that terms such as those defined in commonly used dictionaries should be interpreted as having meanings that are consistent with their meanings in the context of the relevant art and will not be interpreted in an idealized or overly formal sense unless expressly so defined herein.

An electronic device according to some example embodiments may include at least one of, for example, a smart phone, a tablet personal computer (PC), a mobile phone, a video phone, an e-book reader, a desktop PC, a laptop PC, a netbook computer, a workstation, a server, a personal digital assistant (PDA), a portable multimedia player (PDP), an MP3 player, a mobile medical device, a camera, and a wearable device, or the like, but is not limited thereto. According to some example embodiments, the wearable device may include at least one of an accessory-type wearable device (for example, a watch, a ring, a bracelet, an ankle bracelet, a necklace, glasses, a contact lens, or a head-mounted device (HMD)), a fabric- or clothing-integrated type wearable device (for example, an electronic dress), a body-attached type wearable device (for example, a skin pad or a tattoo), and a body implanted type wearable device 9 for example, an implantable circuit), or the like, but is not limited thereto.

In some example embodiments, the electronic device may be a home appliance. The home appliance may include at least one of, for example, a television (TV), a digital video disk (DVD) player, an audio, a refrigerator, an air conditioner, a vacuum cleaner, an oven, a microwave, a washing machine, an air cleaner, a set-top box, a home automation control panel, a security control panel, a TV box (for example, Samsung HoneSync™, Apple TV™, or Google TV™, a game console (for example, Xbox™ or PlayStation™), an electronic dictionary, an electronic key, a camcorder, and an electronic picture frame, or the like, but is not limited thereto.

According to other example embodiments, the electronic device may include at least one of various medical devices (for example, various portable medical measuring devices (a blood sugar measuring device, a heartbeat measuring device, a blood pressure measuring device, and a thermometer), magnetic resonance angiography (MRA), magnetic resonance imaging (MRI), computed tomography (CT), and an ultrasonic machine), a navigation device, a global navigation satellite system (GNSS), an event data recorder (EDR), a flight data recorder (FDR), a vehicle infotainment device, a marine electronic device (for example, a marine navigation equipment or a gyro compass), avionics, a security device, a vehicle head unit, industrial or home robots, automatic teller's machine, point of sales (POS), and Internet of things (for example, a bulb, various sensors, an electric or gas meter, a sprinkler, a fire alarm, a thermostat, a streetlight, a toaster, a sports good, a hot water tank, a heater, and a boiler, or the like, but is not limited thereto.

According to some example embodiments, the electronic device may include at least one of a part of a furniture or a building/structure, an electronic board, an electronic signature receiving device, a projector, and various measuring devices (for example, a water gauge, an electric meter, a gas meter, and a radio wave meter), or the like, but is not limited thereto. According to some example embodiments, the electronic device may be a combination of at least one of the devices described above.

According to some example embodiments, the electronic device may be a flexible electronic device. However, the electronic device according to an example embodiment is not limited thereto, and may include any new electronic device according to technology development.

Hereinafter, the electronic device according to one or more example embodiments will be described with reference to accompanying drawings. In the present disclosure, a user may be a user using the electronic device or an apparatus (for example, an artificial intelligence electronic device) using the electronic device.

FIGS. 1A and 1B are diagrams illustrating an example outer shape of an example electronic device 100 according to an example embodiment.

Referring to FIGS. 1A and 1B, the electronic device 100 may be realized as a device having various purposes. For example, as described above, the electronic device 100 may be realized as a mobile phone, a smart phone, a laptop computer, or a tablet device, but is not limited thereto.

Referring to FIG. 1A, a display 110 may be provided on a front surface 101 of the electronic device 100. A speaker 120 for receiving voice of the other party may be provided above the display 110. A microphone 130 for transmitting voice of a user of the electronic device 100 to the other party may be provided below the display 110.

According to an example embodiment, components for performing various functions of the electronic device 100 may be provided around the speaker 120. The components may include at least one sensor module 140. The sensor module 140 may include at least one of, for example, an illumination sensor (for example, an optical sensor), a proximity sensor, an infrared sensor, and an ultrasonic sensor. The components may also include a camera 150. According to an example embodiment, the component may further include a light-emitting diode (LED) indicator 160 for making the user to recognize state information of the electronic device 100.

The electronic device 100 may photograph an object using the camera 150. FIG. 1B is a side view of the electronic device 100. Referring to FIG. 1B, the electronic device 100 may include another camera 150'. However, an embodiment is not limited thereto, and the electronic device 100 may include more cameras. The cameras 150 and 150' of the electronic device 100 may have various view angles. The view angles may be, for example, 30°, 50°, 90°, and 180°. The electronic device 100 may generate an image of each of pictures obtained using the cameras 150 and 150', or generate an image by composing the pictures. For example, when the cameras 150 and 150' have a view angle of 180°, the electronic device 100 may generate an image having a view angle of 360°.

FIG. 2 is a block diagram illustrating an example electronic device 201 in a network environment 200, according to some example embodiments. The electronic device 201 may include the electronic device 100 of FIG. 1.

Referring to FIG. 2, the electronic device 201 may include a bus 210, a processor 220, a memory 230, an input/output (I/O) interface (e.g., including I/O circuitry) 250, a display 260, and a communication interface (e.g., including communication circuitry) 270. According to some embodiments, the electronic device 201 may not include at least one of the above components or may additionally include another component.

The bus 210 may, for example, connect the processor 220, the memory 230, the I/O interface 250, the display 260, and the communication interface 270 to each other, and may include a circuit for transmitting and receiving information (for example, a control message and/or data) to and from the processor 220, the memory 230, the I/O interface 250, the display 260, and the communication interface 270.

The processor 220 may include at least one of a central processing unit (CPU), an application processor (AP), and a communication processor (CP). The processor 220 may control at least one component of the electronic device 201 and/or execute an operation related to communication or a data process.

The memory 230 may include a volatile and/or nonvolatile memory. The memory 230 may store, for example, a command or data related to at least one component of the electronic device 201. According to an example embodiment, the memory 230 may store software and/or a program 240. The program 240 may include, for example, a kernel 241, a middleware 243, an application programming interface (API) 245, and/or an application program (or an application) 247. At least some of the kernel 241, the middleware 243, and the API 245 may be referred to as an operating system (OS).

The kernel 241 may, for example, control or manage system resources (for example, the bus 210, the processor 220, and the memory 230) used to execute an operation or a function realized other programs (for example, the middleware 243, the API 245, and the application program 247). Also, the kernel 241 may provide an interface for controlling or managing the system resources as the middleware 243, the API 245, or the application program 247 accesses individual components of the electronic device 201.

The middleware 243 may, for example, operate as a relay for the API 245 or the application program 247 to communicate with the kernel 241 to exchange data.

Also, the middleware 243 may process at least one job request received from the application program 247 according to a priority. For example, the middleware 243 may assign, to at least one of the application programs 247, a priority of using the system resource (for example, the bus 210, the processor 220, or the memory 230) of the electronic device 201. For example, the middleware 243 may process the at least one job request according to the assigned priority to perform scheduling or load balancing with respect to the at least one job request.

The API 245 is, for example, an interface enabling the application program 247 to control functions provided by the kernel 241 or the middleware 243, and for example, may include at least one interface or function (for example, command) for controlling a file, controlling a window, processing a picture, or controlling a character.

The I/O interface 250 may include various I/O interface circuitry configured to operate, for example, as an interface capable of transmitting a command or data input from the user or an external device to at least one of the components of the electronic device 201. Also, the I/O interface 250 may output a command or data received from at least one of the components of the electronic device 201 to the user or the other external device.

The display 260 may include, for example, a liquid crystal display (LCD), a light-emitting diode (LED) display, an organic light-emitting diode (OLED) display, a microelectromechanical systems (MEMS) display, or an electronic paper display, or the like, but is not limited thereto.

The display 260 may display, for example, various type of content (for example, text, an image, a video, an icon, or a symbol) to the user. The display 260 may include a touch screen, and for example, may receive a touch, gesture, proximity, or hovering input using an electronic pen or a part of a body of the user.

The communication interface 270 may include various communication circuitry configured to set communication between the electronic device 201 and an external device (for example, a first external electronic device 202, a second external electronic device 204, or a server 206). For example, the communication interface 270 may communicate with an external device (for example, the second external electronic device 204 or the server 206) by being connected to a network 262 via wired communication or wireless communication.

The wireless communication may use, for example, at least one of cellular communication protocols, such as long-term evolution (LTE), LTE advance (LTE-A), code division multiple access (CDMA), wideband CDMA (WCDMA), universal mobile telecommunications system (UMTS), wireless broadband (WiBro), and global system for mobile communications (GSM). Also, the wireless communication may include short-range communication 264. The short-range communication 264 may include at least one of, for example, wireless fidelity (WiFi), Bluetooth, near field communication (NFC), and global navigation satellite system (GNSS). The GNSS may include, according to regions or bandwidths, at least one of global positioning system (GPS), Glonass (Russian global navigation satellite system), Beidou navigation satellite system (BDS), and Galileo system (European global satellite-based navigation system). Herein, "GPS" and "GNSS" may be interchangeably used. The wired communication may include at least one of universal serial bus (USB), high definition multimedia interface (HDMI), recommended standard 232 (RS-232), and plain old telephone service (POTS). The network 262 may include at least one of telecommunications networks, such as a computer network (for example, local area network (LAN) or wide area network (WAN), the Internet, and a telephone network.

Each of the first and second external electronic devices 202 and 204 may be the same type as or a different type from the electronic device 201. According to an example embodiment, the server 206 may include a group of one or more servers. According to some embodiments, all or some of operations performed by the electronic device 201 may be performed by one or more electronic devices (for example, the first and second external electronic devices 202 and 204), or the server 206. According to an embodiment, when the electronic device 201 needs to perform a function or service automatically or upon a request, the electronic device 201 may, instead of or in addition to executing the function or the service, request another device (for example, the first or second external electronic device 202 or 204 or the server 206) to perform at least some of related function or service. The other device (for example, the first or second external electronic device 202 or 204 or the server 206) may perform a requested or additional function, and transmit a result of performing the requested or additional function to the electronic device 201. Then, the electronic device 201 may provide the received result or provide the function or the service by additionally processing the received result. At this time, for example, a cloud computing technology, a distributed computing technology, or a client-server computing technology may be used.

According to an example embodiment, the electronic device 201 and the first and second external electronic devices 202 and 204 may transmit images captured using cameras of the electronic device 201 and the first and second external electronic devices 202 and 204 to one of the electronic device 201 and the first and second external electronic devices 202 and 204 using one of the above-described communication methods to compose the images. For example, an image having a view angle of 360° may be generated by composing an image captured by the electronic device 201 and having a view angle of 180° and an image captured by the second external electronic device 204 and having a view angle of 180°.

Figure 3:
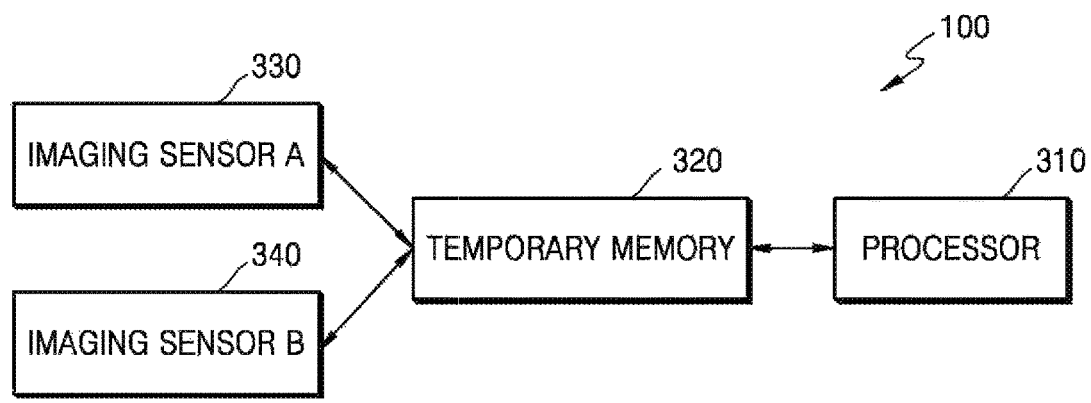
FIG. 3 is a block diagram illustrating an example of the electronic device of FIG. 1.

FIG. 3 is a block diagram illustrating an example of the electronic device 100 of FIG. 1.

Referring to FIG. 3, the electronic device 100 may include a processor 310, a temporary memory 320, an imaging sensor A 330, and an imaging sensor B 340. According to an example embodiment, components of the electronic device 100 illustrated in FIG. 3 are not essential, and thus the electronic device 100 may include more or less components than those illustrated in FIG. 3. For example, the electronic device 100 may be configured by including an input module (for example, a touch panel, a physical key, a proximity sensor, or a bio-sensor), a memory, an analog/digital (A/D) converter, and a power supply unit, etc.

The imaging sensor A 330 and the imaging sensor B 340 may receive light incident through a lens (not shown) and convert the light into an electrical signal. The imaging sensor A 330 may be referred to as a first imaging sensor and the imaging sensor B 340 may be referred to as a second imaging sensor for ease of description. The imaging sensors A and B 330 and 340 may include a pixel sensor for detecting at least two pieces of mixed color information, for example, a white (W) pixel and pixel brightness. For example, the imaging sensors A and B 330 and 340 may include a pixel array in which red (R), green (G), and blue (B) pixel sensors and a W pixel sensor are arranged in a set pattern.

The temporary memory 320 may temporarily store image signals generated and read from the imaging sensors A and B 330 and 340. The image signals may be expressed and stored in a form of general data exchanged between electronic devices. The temporary memory 320 may output a received image signal to the processor 310 faster than a speed of the imaging sensors A and B 330 and 340 reading an image signal. For example, the temporary memory 320 may quickly output an image signal as the processor 310 increases a clock or expands a signal transmission channel.

The processor 310 may control operations of the above components. For example, the processor 310 may generate a synchronization signal such that an image signal is generated at a certain time or at regular time intervals. The processor 310 may control generated image signals to be sequentially transmitted to the temporary memory 320. For example, some of image signals generated in the imaging sensor A may be first transmitted to the temporary memory 320, and then some of image signals generated in the imaging sensor B 340 may be transmitted to the temporary memory 320.

The electronic device 100 may separately include an image processor (not shown) for processing an image signal, or may include the image sensor in the processor 310. Hereinafter, it is assumed that the processor 310 processes an image signal. The processor 310 may perform various post-processes using image signals received through the temporary memory 320. For example, the processor 310 may perform a signal process of adjusting a gain or standardizing a waveform with respect to a received image signal.

The processor 310 may perform a process of removing noise from an image signal. For example, the processor 310 may perform a signal process for improving image quality, such as gamma correction, color filter array interpolation, color matrix, color correction, or color enhancement, etc.

An electronic device according to an example embodiment may include a plurality of imaging sensors including a first imaging sensor and a second imaging sensor, and a processor electrically connected to the plurality of imaging sensors and configured to output a read control signal and a synchronization signal to the plurality of imaging sensors, wherein the processor is configured to output a first read control signal to the first imaging sensor and to store first data read from the first imaging sensor in a temporary memory, to output a second read control signal to the second imaging sensor at a point of time later than the first read control signal and to additionally store second data read from the second imaging sensor in the temporary memory, to control a speed of outputting the first and second data stored in the temporary memory based on an output control signal, the speed of outputting being faster than a speed of reading the first and second data from the first and second imaging sensors to the temporary memory based on the first and second read control signals, and to generate merged data obtained by merging the first data and the second data output from the temporary memory.

In the electronic device according to an example embodiment, the temporary memory may, for example, be located inside the electronic device, separately from the processor.

In the electronic device according to an example embodiment, the first data may include data generable in one horizontal axis line from among pixels included in the first imaging sensor, the second data may include data generable in one horizontal axis line from among pixels included in the second imaging sensor, and the temporary memory may include a space for storing data of a size corresponding to halves of the first data and the second data.

In the electronic device according to an example embodiment, the processor may be configured to connect the one horizontal axis line from among the pixels included in the first data and one horizontal axis line from among the pixels included in the second data as one horizontal axis line.

In the electronic device according to an example embodiment, the speed of outputting the first and second data stored in the temporary memory may be at least two times faster than the speed of reading the first and second data from the first and second imaging sensors to the temporary memory.

In the electronic device according to an example embodiment, the processor may be configured to determine a time difference between outputting of the first read control signal and outputting of the second read control signal based on at least one of the number of the plurality of imaging sensors and a data output speed of the temporary memory.

In the electronic device according to an example embodiment, the first imaging sensor may be included in a first imaging sensor module having a view angle of 180°, the second imaging sensor may be included in a second imaging sensor module having a view angle of 180°, and the processor may be configured to generate an image having a view angle of 360° by merging an image generated by the first imaging sensor module and an image generated by the second imaging sensor module.

In the electronic device according to an example embodiment, the plurality of imaging sensors may further include a third imaging sensor and a fourth imaging sensor, wherein the processor is further configured to output a third read control signal to the third imaging sensor at a point of time later than the second read control signal and to additionally store third data read from the third imaging sensor in the temporary memory, to output a fourth read control signal to the fourth imaging sensor at a point of time later than the third read control signal and to additionally store fourth data read from the fourth imaging sensor in the temporary memory, and to control merged data obtained by merging the first data, the second data, the third data, and the fourth data stored in the temporary memory to be output based on an output control signal the speed of outputting being faster than the reading of the first through fourth data based on the first through fourth read control signals.

In the electronic device according to an example embodiment, the first data, the second data, the third data, and the fourth data may include data generable in one horizontal axis line from among pixels included respectively in the first through fourth imaging sensors, and the temporary memory may include a space for storing data of a size corresponding to ¾ of each of the first data, the second data, the third data, and the fourth data.

In the electronic device according to an example embodiment, the processor may be configured to merge the one horizontal axis line from among the pixels included in the first data, the one horizontal axis line from among the pixels included in the second data, the one horizontal axis line from among the pixels included in the third data, and the one horizontal axis line from among the pixels included in the fourth data into one horizontal axis line.

In the electronic device according to an example embodiment, the speed of outputting the first through fourth data stored in the temporary memory based on the output control signal may be at least four times faster than the speed of reading the first through fourth data from the first through fourth imaging sensors to the temporary memory based on the first through fourth read control signals.

In the electronic device according to an example embodiment, the processor may determine time differences between outputting of the first read control signal, outputting of the second read control signal, outputting of the third read control signal, and outputting of the fourth read control signal based on at least one of the number of the plurality of imaging sensors and a data output speed of the temporary memory.

Referring back to FIG. 3, the imaging sensors A and B 330 and 340 may each be included in an imaging sensor module.

Figure 4:
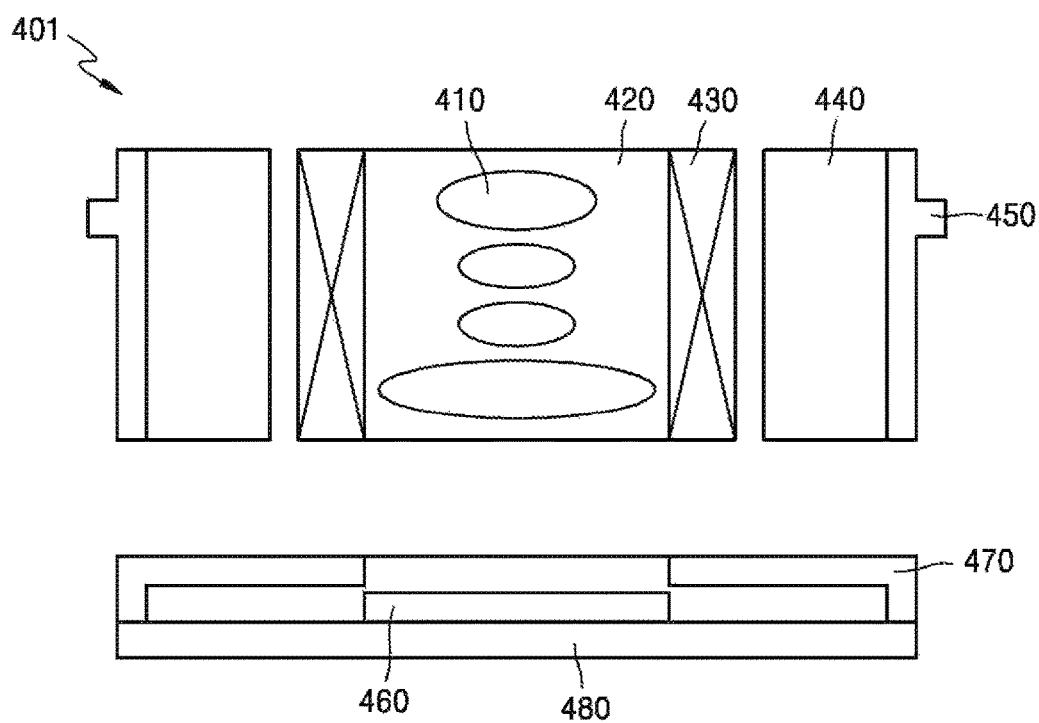
FIG. 4 is a diagram for illustrating an example imaging sensor module of the electronic device of FIG. 1.

FIG. 4 is a diagram illustrating an example imaging sensor module 401 of the electronic device 100 of FIG. 1.

Referring to FIG. 4, the imaging sensor module 401 according to some example embodiments may include a cover member 450, a lens 410, a lens barrel 420, a coil unit (e.g., including a coil) 430, a magnet unit (e.g., including a magnet) 440, a base 470, an imaging sensor 460, and a circuit board 480.

The cover member 450 may form an outer shape of the imaging sensor module 401. The cover member 450 may protect various components provided therein.

The lens 410 may include a plurality of lenses. For example, the lens 410 may include a lens moving for auto-focus and a lens moving for a zoom operation. An image received from the lens 410 may be transmitted to the imaging sensor 460.

The lens barrel 420 may accommodate the lens 410. The coil unit 430 may be provided outside the lens barrel 420. The magnet unit 440 may be provided at a location corresponding to the coil unit 430. The magnet unit 440 may be provided to face the coil unit 430. According to some example embodiments, the electronic device 100 may operate as an optical image stabilizer (OIS) by moving the lens 410 through an interaction between an electromagnetic field and a magnetic field of the magnet unit 440 and the coil unit 430, using an OIS driving module (not shown).

For example, the electronic device 100 may move the lens 410 based on an interaction between an electromagnetic field generated in the coil unit 430 and a magnetic field generated in the magnet unit 440 after power is supplied to the coil unit 430. Accordingly, the electronic device 100 may detect a hand tremble of the user and move the lens 410 in a direction opposite to the hand tremble, thereby preventing an image blur. The electronic device 100 according to an example embodiment may detect the hand tremble of the user and move the imaging sensor 460 in a direction opposite to the hand tremble to prevent and/or reduce an image blur.

The base 470 may be combined with the cover member 450. The base 470 may support a bottom portion of the cover member 450. An infrared light blocking filter may be additionally provided at a location above the base 470, which corresponds to the imaging sensor 460. The base 470 may perform a sensor holder function of protecting the imaging sensor 460.

The imaging sensor 460 may be provided above the circuit board 480. The imaging sensor 460 may be electrically connected to the circuit board 480 via wire bonding or via flip bonding using an electric-conductive paste.

The circuit board 480 may include a plurality of circuit patterns (not shown), and transmit a signal converted using the imaging sensor 460 to the processor 310.

The imaging sensor 460 may include a pixel array in which color pixels (for example, R, G, and B pixel sensors) and a white pixel are arranged in a set pattern. The pixel array converts an optical image signal of an external object incident through the lens 410 into an electrical image signal.

Figure 5:
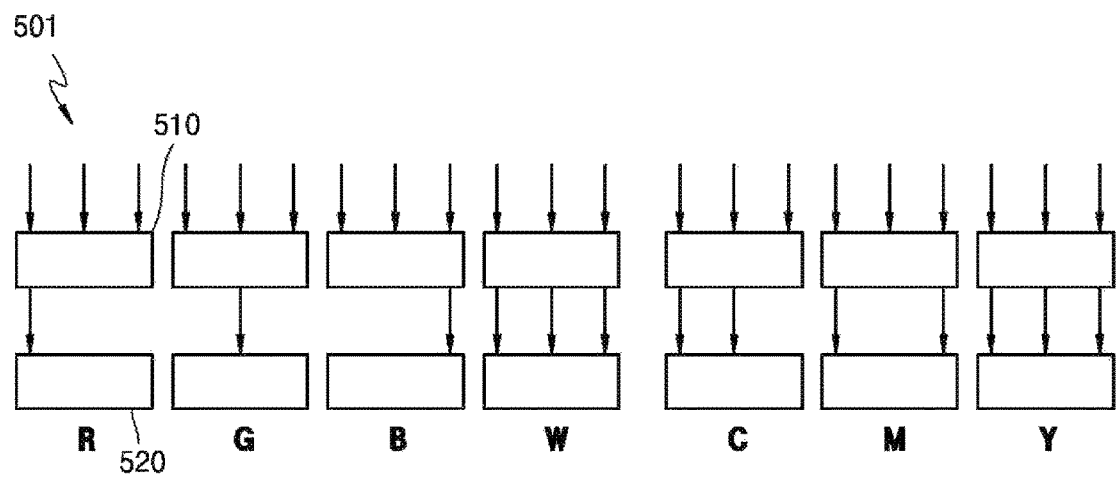
FIG. 5 is a diagram illustrating an example of pixels included in an imaging sensor of the electronic device of FIG. 1.

FIG. 5 is a diagram illustrating example pixels 501 included in an imaging sensor of the electronic device 100 of FIG. 1.

As illustrated in FIG. 5, each of the pixels 501 may convert an optical signal into an electric signal. Each pixel 501 may include at least one micro lens (not shown), at least one color filter 510, and at least one photodiode 520.

The micro lens may concentrate external incident light.

The color filter 510 may include at least one of a R filter, a G filter, a B filter, a W filter, a cyan filter, a magenta filter, and a yellow filter.

The photodiode 520 may convert an optical signal into an electric signal.

Figure 6:
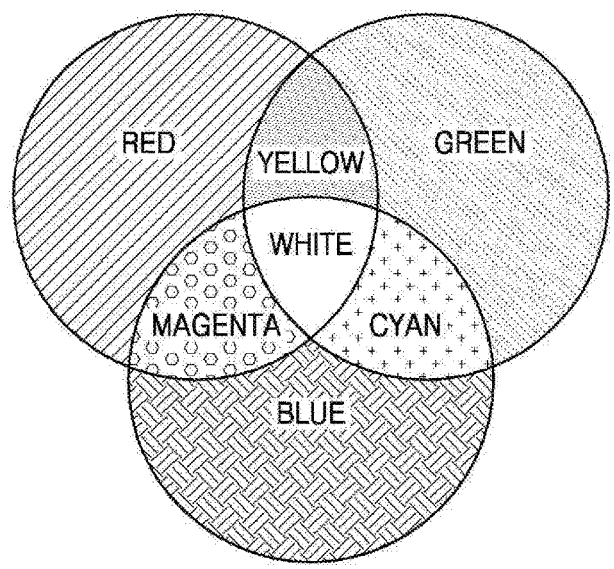
FIG. 6 is a diagram illustrating example pixels included in the imaging sensor of the electronic device of FIG. 1.

FIG. 6 is a diagram illustrating example pixels included in the imaging sensor of the electronic device 100 of FIG. 1.

As illustrated in FIGS. 5 and 6, the R filter may transmit light in a red wavelength band. The G filter may transmit light in a green wavelength band. The B filter may transmit light in a blue wavelength band. A W filter may transmit light in all wavelength band of a visible ray range. The cyan filter may transmit light in a green and blue wavelength band. The magenta filter may transmit light in red and blue wavelength bands. The yellow filter may transmit light in red and green wavelength bands.

Figure 7:
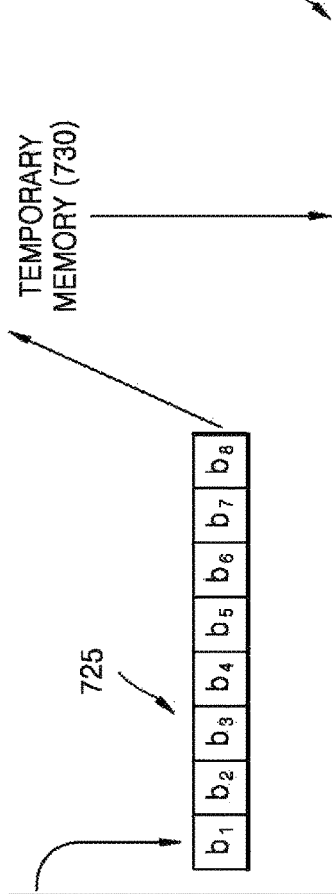
FIG. 7 is a diagram illustrating an example situation where an electronic device transmits an image signal to a temporary memory according to an example embodiment.

FIG. 7 is a diagram illustrating an example situation where an electronic device transmits an image signal to a temporary memory 730 according to an example embodiment. The situation will be described with reference to FIGS. 3 and 7. Hereinafter, it is assumed that an imaging sensor includes 8×8 pixels for ease of description, but is not limited thereto.

Referring to FIG. 7, the processor 310 may photograph an object by controlling the imaging sensor module 401. The processor 310 may control imaging sensors A and B 710 and 720 to photograph the object almost at the same time using a synchronization signal. The imaging sensors A and B 710 and 720 may convert a received optical signal into an image signal. In this regard, the imaging sensors A and B 710 and 720 may transmit electric charges generated in pixels 711 and 721, e.g., image signals, to the temporary memory 730.

The imaging sensors 710 and 720 may transmit an image signal to the temporary memory 730 according to lines. For example, the imaging sensor A 710 may transmit lines from a first line 715 to a temporary memory 731 of the imaging sensor A 710. A speed of outputting an image signal from the temporary memory 730 to the processor 310 may, for example, be two times faster than a speed of transmitting an image signal from the imaging sensor A 710 to the temporary memory 730. Accordingly, the temporary memory 731 may output received data to the processor 310 smoothly by only using a space for accommodating only a half of a data amount corresponding to the first line 715.

Similarly, the imaging sensor B 720 may also transmit lines from a first line 725 to a temporary memory 732 of the imaging sensor B. A speed of outputting an image signal from the temporary memory 730 to the processor 310 may, for example, be two times faster than a speed of transmitting an image signal from the imaging sensor B 720 to the temporary memory 730. Accordingly, the temporary memory 732 may output received data to the processor 310 smoothly by only using a space for accommodating only a half of a data amount corresponding to the first line 725.

Detailed processes of transmitting an image signal from the imaging sensors A and B 710 and 720 to the processor 310 through the temporary memory 730 will be described in greater detail below with reference to FIG. 8.

The temporary memory 730 may sequentially output data of one line amount received from each of the imaging sensors A and b 710 and 720 to the processor 310. The processor 310 may form one line 740 by connecting the first line 715 received from the imaging sensor A 710 and the first line 725 received from the imaging sensor B 720. By repeating such a process, the processor 310 may generate one image by composing an image generated by the imaging sensor A 710 and an image generated by the imaging sensor B 720.

Hereinafter, processes of outputting image signals from the imaging sensors A and B 710 and 720 to the processor 310 through the temporary memory 730 will be described.

Figure 8:
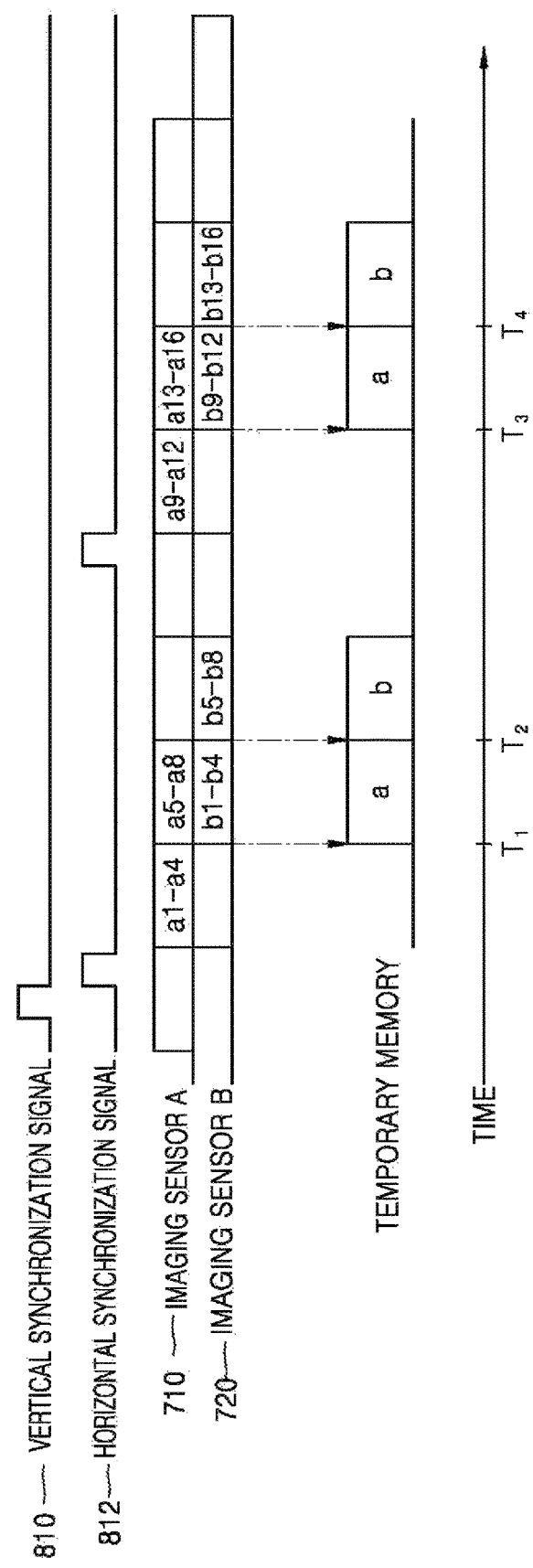
FIG. 8 is a diagram illustrating an example process of transmitting, by an electronic device, an image signal based on a synchronization signal of a processor according to an example embodiment.

FIG. 8 is a diagram illustrating an example process of transmitting, by the electronic device 100, an image signal based on a synchronization signal of the processor 310 according to an example embodiment.

Referring to FIG. 8, the processor 310 may control each of the imaging sensors A and B 710 and 720 using a vertical synchronization signal 810 and a horizontal synchronization signal 812. The vertical synchronization signal 810 is a signal for adjusting synchronization based on frames and the horizontal synchronization signal 812 is a signal for adjusting synchronization based on lines included in each frame.

Based on the vertical and horizontal synchronization signals 810 and 812, the imaging sensor A 710 may transmit the first line 715 to the temporary memory 730. A data output speed of the temporary memory 730 according to an example embodiment may, for example, be two times faster than a data output speed of the imaging sensors A and B 710 and 720.

At a point of time T1, when the imaging sensor A 710 has transmitted at least half of data of the first line 715, the processor 310 may control the temporary memory 730 to output the received data to the processor 310. At this time, the processor 310 may control the imaging sensor B 720 to transmit data of the first line 725 to the temporary memory 732. In other words, the processor 310 may set a time when the imaging sensor A 710 outputs data to the temporary memory 730 and a time when the imaging sensor B 720 outputs data to the temporary memory 730 to not be the same.

At a point of time T2, when the temporary memory 730 has output all of the first line 715 of the imaging sensor A 710 to the processor 310, the processor 310 may control the temporary memory 730 to output the first line 725 of the imaging sensor B to the processor 310.

At the point of time T2, the temporary memory 730 may have output the first line 715 of the imaging sensor A 710 to the processor 310. In other words, as described above, by misaligning the times when the imaging sensors A and B 710 and 720 output data, the first line 725 of the imaging sensor B 720 may be output to the processor 310 after all of the first line 715 of the imaging sensor A 710 is output to the processor 310.

As a result, as described above, as the processor 310 varies the times when the imaging sensors A and B 710 and 720 transmit data to the temporary memory 730, the temporary memories 731 and 732 may smoothly output data to the processor 310 by only using storage spaces corresponding to only halves of lines of the imaging sensors A and B 710 and 720.

As described above with reference to FIG. 7, when all of the first line 715 of the imaging sensor A 710 and all of the first line 725 of the imaging sensor B 720 are received, the processor 310 may connect the first lines 715 and 725 to one line. Also, the processor 310 may generate one image by accumulating and combining all lines received from the imaging sensors A and B 710 and 720.

FIG. 9 is a flowchart illustrating an example method of combining, by an electronic device, image signals generated by imaging sensors, according to an embodiment.

In operation 910, the electronic device 100 may output a read control signal based on an event, such as receipt of a user input. The read control signal may be, for example, a signal for reading data from an imaging sensor. When the read control signal is output, the electronic device 100 may photograph an object by operating the imaging sensor module 401. In operation 920, the electronic device 100 may photograph an object by using the imaging sensors A and B 710 and 720, and store signals read from the imaging sensors A and B 710 and 720 in the temporary memory 730.

In operation 930, the electronic device 100 may store the first line 715 of the imaging sensor A 710, for example, first data, in the temporary memory 730 based on a first read control signal.

In operation 940, when at least half of the first line 715, for example, the first line, of the imaging sensor A 710 is stored in the temporary memory 730, the electronic device 100 may output data stored in the temporary memory 730 to the processor 310 at a speed, for example, two times faster than a speed of transmitting data from the imaging sensor A 710, based on an output control signal. The output control signal may be, for example, a signal for outputting data from the temporary memory 730 to the processor 310.

In operation 940, the electronic device 100 may output a second read control signal to the imaging sensor B at a point of time later than the first read control signal. The electronic device 100 may store the first line 725, for example, second data, of the imaging sensor B 720 in the temporary memory 730 based on the second read control signal.

In operation 950, when the temporary memory 730 has transmitted all of the first line 715, for example, the first data, of the imaging sensor A 710 to the processor 310, the electronic device 100 may output the first line 725, for example, the second data, of the imaging sensor B 720 stored in the temporary memory 730 to the processor 310 at a speed two times faster than a data transmission speed of the imaging sensor B 720, based on an output control signal.

In operation 960, the electronic device 100 may output merged data obtained by merging the first line 715, for example, the first data, of the imaging sensor A 710 and the first line 725, for example, the second data, of the imaging sensor B 720 into one line.

The electronic device 100 may generate one composed image by repeating such operations with respect to lines transmitted from the imaging sensors A and B 710 and 720.

In a method of controlling an electronic device, according to an example embodiment, capacity of a temporary memory may be optimized and/or improved and hardware may be efficiently configured by adjusting read timings of data read from a plurality of imaging sensors. Also, in the method, the data read from the plurality of imaging sensors may be efficiently stored and a composed image may be generated using small capacity of the temporary memory.

Figure 10A:
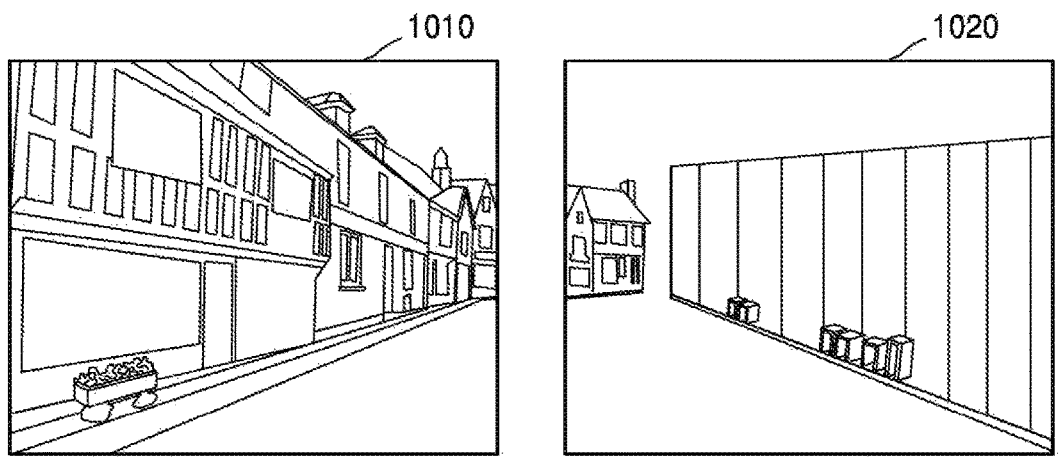
FIGS. 10A and 10B are diagrams illustrating an example of an electronic device composing two images to obtain one image according to an example embodiment.
Figure 10B:

FIGS. 10A and 10B are diagrams illustrating an example of an electronic device composing two images to obtain one image according to an example embodiment.

Referring to FIG. 10A, a first image 1010 may be generated by the imaging sensor A 710. The imaging sensor A 710 may be, for example, an image sensor included in the camera 150 provided on a front surface of the electronic device 100 of FIG. 1. The first image 1010 may have a view angle of 180°.

A second image 1020 may be generated by the imaging sensor B 720. The imaging sensor B 720 may be included in the camera 150' provided on a surface opposite to the front surface of the electronic device 100. The second image 1020 may also have a view angle of 180°.

Referring to FIG. 10B, a third image 1030 may be obtained by composing the first image 1010 and the second image 1020. Since the first and second images 1010 and 1020 each have a view angle of 180°, the third image 1030 may have a view angle of 360°.

When an object is photographed using the electronic device 100, the user may easily obtain an image having a view angle of 360° by photographing the object only once.

A method of controlling an electronic device including a plurality of imaging sensors including a first imaging sensor and a second imaging sensor, according to an example embodiment, may include: outputting a first read control signal to the first imaging sensor and storing first data read from the first imaging sensor in a temporary memory; outputting a second read control signal to the second imaging sensor at a point of time later than the first read control signal and storing second data read from the second imaging sensor in the temporary memory; controlling a speed of outputting the first data and the second data stored in the temporary memory based on an output control signal, the speed of outputting being faster than a speed of reading the first data and the second data from the first and second imaging sensors to the temporary memory based on the first and second read control signals; and generating merged data obtained by merging the first data and the second data output from the temporary memory.

According to the method, the first data may include data generable in one horizontal axis line from among pixels included in the first imaging sensor, the second data may include data generable in one horizontal axis line from among pixels included in the second imaging sensor, and the temporary memory may have a space for storing data of a size corresponding to halves of the first data and the second data.

According to the method, the generating of the merged data may include connecting the one horizontal axis line from among the pixels included in the first data and the one horizontal axis line from among the pixels included in the second data to one horizontal axis line.

According to the method, the speed of outputting the first data and the second data stored in the temporary memory may be at least two times faster than the speed of reading the first data and the second data from the first and second imaging sensors to the temporary memory.

According to the method, a time difference between outputting of the first read control signal and outputting of the second read control signal may be determined based on at least one of the number of the plurality of imaging sensors and a data output speed of the temporary memory.

Figure 11:
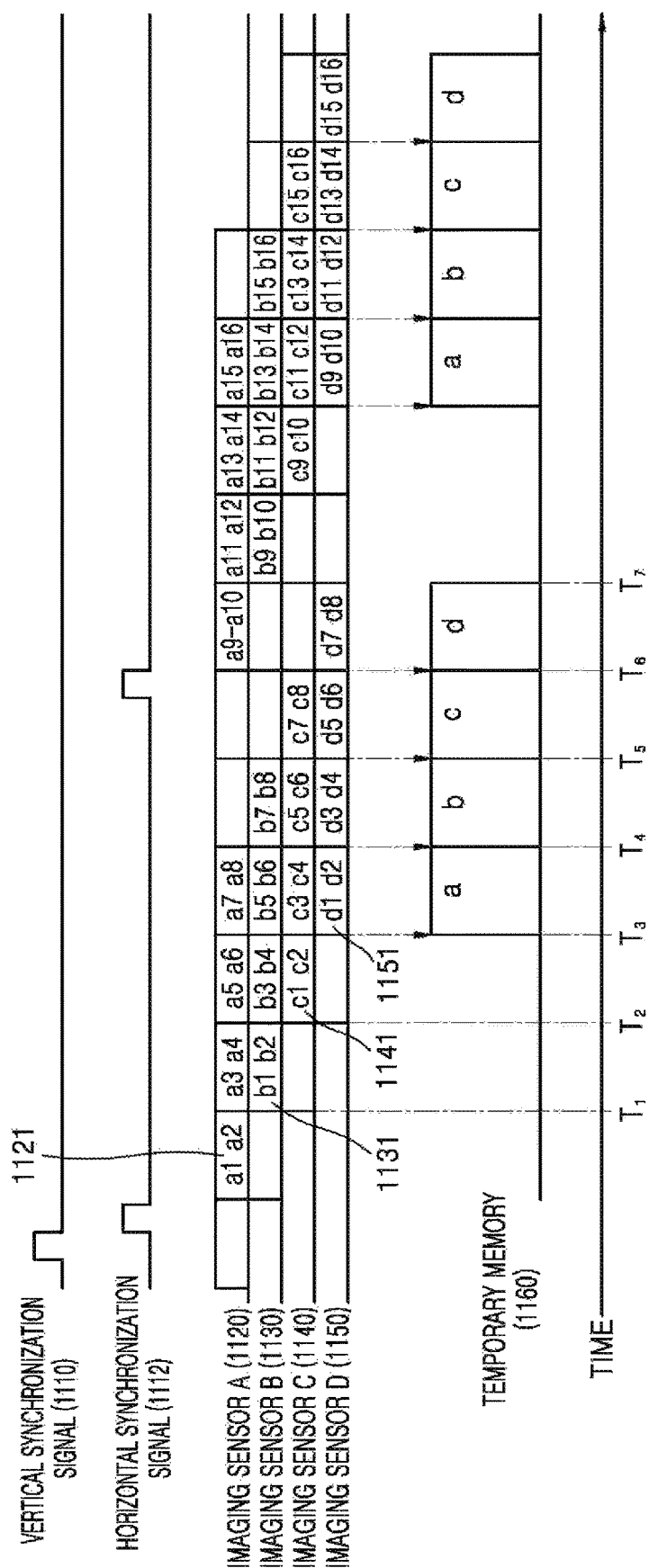
FIG. 11 is a diagram illustrating an example process of transmitting, by an electronic device, an image signal based on a synchronization signal of a processor, when the electronic device includes four imaging sensors according to another example embodiment.

FIG. 11 is a diagram illustrating an example process of transmitting, by the electronic device 100, an image signal based on a synchronization signal of the processor 310, when the electronic device 100 includes four imaging sensors according to another example embodiment.

Based on a vertical synchronization signal 1110 and a horizontal synchronization signal 1112 generated by the processor 310, an imaging sensor A 1120 may transmit data corresponding to a first line 1121 to a temporary memory 1160. A data output speed of the temporary memory 1160 may, for example, be four times faster than a data transmission speed of imaging sensors A through D 1120 through 1150, according to an example embodiment.

At a point of time T1, when the imaging sensor A 1120 has transmitted at least ¼ of data of the first line 1121 to the temporary memory 1160, the processor 310 may transmit data corresponding to the first line 1131 of the imaging sensor B 1130 to the temporary memory 1160.

At a point of time T2, when the imaging sensor B 1130 has transmitted at least ¼ of data of the first line 1131 to the temporary memory 1160, the processor 310 may transmit data corresponding to a first line 1141 of the imaging sensor C 1140 to the temporary memory 1160.

At a point of time T3, when the imaging sensor C 1140 has transmitted at least ¼ of data of the first line 1141 to the temporary memory 1160, the processor 310 may transmit data corresponding to a first line 1151 of the imaging sensor D 1150 to the temporary memory 1160. Also, the processor 310 may output the data corresponding to the first line 1121 of the imaging sensor A 1120, which is stored in the temporary memory 1160, to the processor 310.

As such, the processor 310 may set times of outputting data of the imaging sensors A through D 1120 through 1150 to the temporary memory 1160 to be not the same, but to be misaligned.

Since the data output speed of the temporary memory 1160 is four times faster in this example than the data transmission speed of the imaging sensors A through D 1120 through 1150, at a point of time T4, the temporary memory 1160 may have output all of the first line 1121 of the imaging sensor A 1120 to the processor 310. Also, at a point of time T5, the temporary memory 1160 may have output all of the first line 1131 of the imaging sensor B 1130 to the processor 310.

As described above, since the processor 310 sets the times of outputting the data of the imaging sensors A through D 1120 through 1150 to be misaligned, the first line 1131 of the imaging sensor B 1130 may be output to the processor 310 after all of the first line 1121 of the imaging sensor A has transmitted to the processor 310.

Similarly, at a point of time T6, the temporary memory 1160 may have output all of the first line 1141 of the imaging sensor C 1140 to the processor 310, and at a point of time T7, the temporary memory 1160 may have output all of the first line 1151 of the imaging sensor D 1150 to the processor 310.

As a result, as described above, since the processor 310 varies times when the imaging sensors A through D 1120 through 1150 start to output data to the temporary memory 1160, the temporary memory 1160 may smoothly output data to the processor 310 even if the temporary memory 1160 has a storage space corresponding to only ¾ of each line of the imaging sensors A through D 1120 through 1150.

FIG. 12 is a flowchart illustrating an example method of combining, by the electronic device 100, image signals generated by each of the imaging sensors A through D 1120 through 1150, when the electronic device 100 includes four imaging sensors, e.g., the imaging sensors A through D 1120 through 1150 according to another example embodiment.

In operation 1210, the electronic device 100 may output a read control signal based on an event, such as receiving a user input. According to the read control signal, for example, a first read control signal may be output to the imaging sensor A 1120, a second read control signal may be output to the imaging sensor B 1130, a third read control signal may be output to the imaging sensor C 1140, and a fourth read control signal may be output to the imaging sensor D 1150.

When the read control signal is output, the electronic device 100 may operate the imaging sensor module 401 to photograph an object.

In operation 1220, the electronic device 100 may photograph the object using the imaging sensors A through D 1120 through 1150 and then store signals read from the imaging sensors A through D 1120 through 1150 in the temporary memory 1160.

In operation 1230, the electronic device 100 may store the first line 1121, for example, first data, of the imaging sensor A 1120 in the temporary memory 1160 based on the first read control signal.

In operation 1240, when at least ¼ of the first line 1121 of the imaging sensor A 1120 is stored in the temporary memory 1160, the electronic device 100 may store the first line 1131, for example, second data, of the imaging sensor B 1130 in the temporary memory 1160 based on the second read control signal.

In operation 1250, when at least ¼ of the first line 1131, e.g., the second data, of the imaging sensor B 1130 is stored in the temporary memory 1160, the electronic device 100 may store the first line 1141, for example, third data, of the imaging sensor C 1140 in the temporary memory 1160 based on the third read control signal.

In operation 1260, when at least ¾ of the first line 1121 of the imaging sensor A 1120 is stored in the temporary memory 1160, the electronic device 100 may output the first line 1121 of the imaging sensor A 1120, which is stored in the temporary memory 1160, to the processor 310 based on an output control signal.

In operation 1260, when at least ¼ of the first line 1141 of the imaging sensor C 1140 is stored in the temporary memory 1160, the electronic device 100 may store the first line 1151, for example, fourth data, of the imaging sensor D 1150 in the temporary memory 1160 based on the fourth read control signal.

In operation 1270, when at least ¾ of the first line 1131 of the imaging sensor B 1130 is stored in the temporary memory 1160, the electronic device 100 may output the first line 1131 of the imaging sensor B 1130, which is stored in the temporary memory 1160, to the processor 310.

In operation 1280, when at least ¾ of the first line 1141 of the imaging sensor C 1140 is stored in the temporary memory 1160, the electronic device 100 may output the first line 1141 of the imaging sensor C 1140, which is stored in the temporary memory 1160, to the processor 310.

In operation 1290, when at least ¾ of the first line 1151 of the imaging sensor D 1150 is stored in the temporary memory 1160, the electronic device 100 may output the first line 1151 of the imaging sensor D 1150, which is stored in the temporary memory 1160, to the processor 310.

In operation 1295, the electronic device 100 may output merged data obtained by merging the first line 1121 of the imaging sensor A 1120, the first line 1131 of the imaging sensor B 1130, the first line 1141 of the imaging sensor C 1140, and the first line 1151 of the imaging sensor D 1150 into one line.

The electronic device 100 may repeatedly perform such operations on lines output from the imaging sensors A through D 1120 through 1150 to generate one composed image.

Figure 13A:
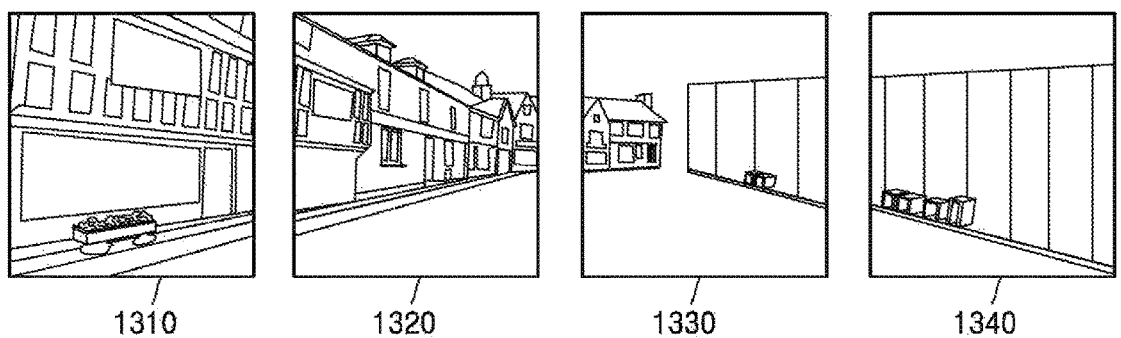
FIGS. 13A and 13B are diagrams illustrating an example of an electronic device composing four images to obtain one image.
Figure 13B:
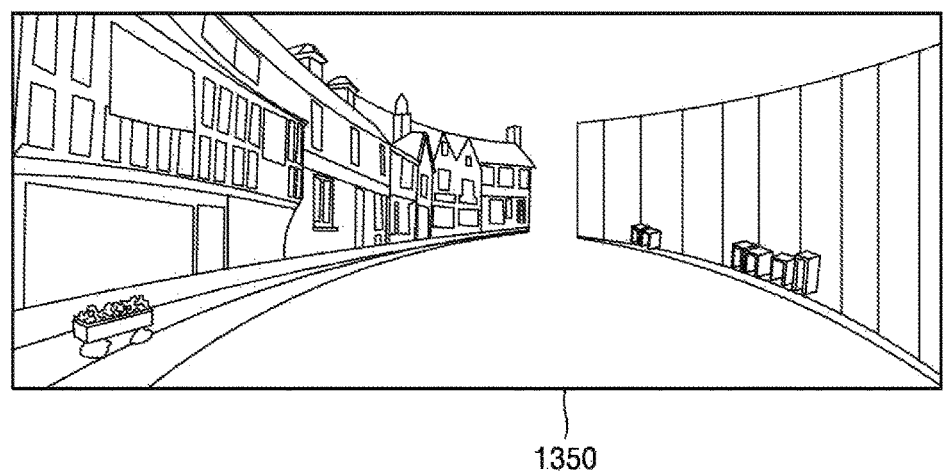

FIGS. 13A and 13B are diagrams illustrating an example of the electronic device 100 composing four images to obtain one image.

Referring to FIG. 13A, a first image 1310 may be generated by the imaging sensor A 1120 and have a view angle of 90°. A second image 1320 may be generated by the imaging sensor B 1130 and have a view angle of 90°. A third image 1330 may be generated by the imaging sensor C 1140 and have a view angle of 90°. A fourth image 1340 may be generated by the imaging sensor D 1150 and have a view angle of 90°.

Referring to FIG. 13B, a fifth image 1350 may be obtained by composing the first through fourth images 1310 through 1340. Since each of the first through fourth images 1310 through 1340 has a view angle of 90°, the fifth image 1350 may have a view angle of 360°.

Accordingly, when an object is photographed by using the electronic device 100, the user may easily obtain an image having a view angle of 360° by photographing the object only once.

Figure 14:
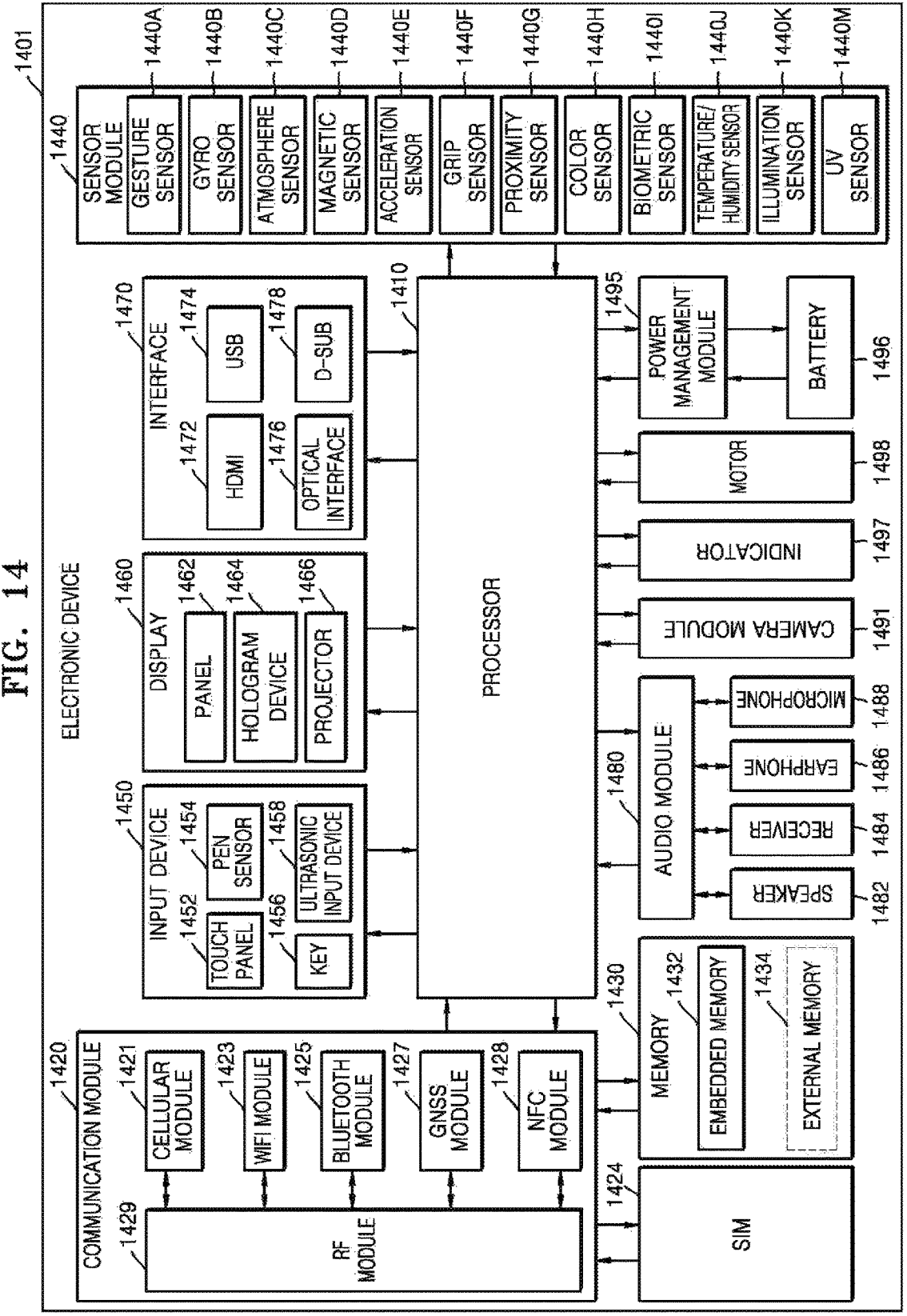
FIG. 14 is a block diagram illustrating an example electronic device according to some example embodiments.

FIG. 14 is a block diagram illustrating an example electronic device 1401 according to some example embodiments. The electronic device 100 of FIG. 1 may include the electronic device 1401. The electronic device 1401 may include, for example, some or all of the components of the electronic device 100 of FIG. 1. The electronic device 1401 may include at least one AP 1410, a communication module (e.g., including communication circuitry) 1420, a subscriber identity module (SIM) 1424, a memory 1430, a sensor module 1440, an input device (e.g., including input circuitry) 1450, a display 1460, an interface (e.g., including interface circuitry) 1470, an audio module 1480, a camera module 1491, a power management module 1495, a battery 1496, an indicator 1497, and a motor 1498.

The AP 1410 may control a plurality of hardware or software components connected to the AP 1410 by driving an operating system or an application program, and may perform various data processes and operations. The processor 310 of FIG. 3 may include the AP 1410 of FIG. 14. The AP 1410 may be realized, for example, as a system-on-chip (SoC). According to an embodiment, the AP 1410 may further include a graphic processing unit (GPU) and/or an image signal processor. The AP 1410 may include at least one of the components illustrated in FIG. 14, for example, a cellular module 1421. The AP 1410 may load and process a command or data received from at least one of other components (for example, a nonvolatile memory) in a volatile memory, and store various types of data in the nonvolatile memory.

The communication module 1420 may have the same or similar configuration as the communication interface 270 of FIG. 2. The communication module 1420 may include various communication circuitry, such as, for example, and without limitation, the cellular module 1421, a WiFi module 1423, a Bluetooth module 1425, a GNSS module 1427 (for example, a GPS module, a Glonass module, a BDS module, or a Galileo module), an NFC module 1428, and a radio frequency (RF) module 1429.

The cellular module 1421 may provide, for example, a voice call service, an image call service, a text service, or an Internet service, through a communication network.

Each of the WiFi module 1423, the Bluetooth module 1425, the GNSS module 1427, and the NFC module 1428 may include a processor for processing data transmitted and received through a respective module.

The RF module 1429 may transmit and receive a communication signal, for example, an RF signal. The RF module 1429 may include, for example, a transceiver, a power amp module (PAM), a frequency filter, a low noise amplifier (LNA), or an antenna. According to another embodiment, at least one of the cellular module 1421, the WiFi module 1423, the Bluetooth module 1425, the GNSS module 1427, and the NFC module 1428 may transmit and receive an RF signal through a separate RF module.

The SIM 1424 may include a card including SIM and/or an embedded SIM, and may include intrinsic identification information (for example, integrated circuit card identifier (ICCID)) or subscriber information (for example, international mobile subscriber identity (MI)).

The memory 1430 (for example, the memory 230) may include an embedded memory 1432 or an external memory 1434. The embedded memory 1432 may include at least one of a volatile memory (for example, a dynamic random access memory (DRAM), a static RAM (SRAM), or a synchronous dynamic RAM (SDRAM), a nonvolatile memory (for example, a one-time programmable read-only memory (OTPROM), a programmable ROM (PROM), an erasable and programmable ROM (EPROM), an electrically erasable and programmable ROM (EEPROM), a mask ROM, a flash ROM, a flash memory (for example, a NAND flash memory or a NOR flash memory), a hard drive, or a solid state drive (SSD)).

The external memory 1434 may include a flash drive, and may further include, for example, a compact flash (CF) memory, a secure digital (SD) memory, a micro-SD memory, a mini-SD memory, an extreme digital (xD) memory, a multi-media card (MMC), or a memory stick. The external memory 1434 may be operably and/or physically connected to the electronic device 1401 through any one of various interfaces.

The sensor module 1440 may measure a physical amount or detect an operation state of the electronic device 1401, and convert measured or detected information to an electrical signal. For example, the sensor module 1440 may include at least one of a gesture sensor 1440A, a gyro sensor 1440B, an atmosphere sensor 1440C, a magnetic sensor 1440D, an acceleration sensor 1440E, a grip sensor 1440F, a proximity sensor 1440G, a color sensor 1440H (for example, an RGB sensor), a biometric sensor 1440I, a temperature/humidity sensor 1440J, an illumination sensor 1440IK, and an ultraviolet (UV) sensor 1440M. Additionally or alternatively, the sensor module 1440 may include, for example, an E-noise sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1440 may further include a control circuit for controlling at least one sensor therein. According to some embodiments, the electric device 1401 may further include a processor configured to control the sensor module 1440 as a part of or separately from the AP 1410 to control the sensor module 1440 while the AP 1410 is in a sleep mode.

The input device 1450 may include various input circuitry, such as, for example, and without limitation, a touch panel 1452 (digital), a pen sensor 1454, a key 1456, and an ultrasonic input device 1458.

The display 1460 (for example, the display 110) may include a panel 1462, a hologram device 1464, or a projector 1466. The panel 1462 may have the same or similar configuration as the display 260 of FIG. 2. The panel 1462 may be realized to be flexible, transparent, or wearable. The panel 1462 may be configured as one module with the touch panel 1452. The hologram device 1464 may use interference of light to show a 3-dimensional (3D) image in the air. According to an embodiment, the display 1460 may further include a control circuit for controlling the panel 1462, the hologram device 1464, or the projector 1466.

The interface 1470 may include various interface circuitry, such as, for example, and without limitation, a high-definition multimedia interface (HDMI) 1472, a universal serial bus (USB) 1474, an optical interface 1476, or a D-subminiature (D-sub) 1478.

The audio module 1480 may bi-directionally convert sound and an electric signal. At least some components of the audio module 1480 may be included in the I/O interface 250 of FIG. 2. The audio module 1480 may include, for example, a speaker 1482, a receiver 1484, an earphone 1486, or a microphone 1488 to process input or output sound information.

The camera module 1491 may be a device for capturing a still image and a video, and according to an embodiment, may include at least one imaging sensor (for example, a front sensor or a rear sensor), a lens, an image signal processor (ISP), or a flash (for example, an LED or a xenon lamp).

The power management module 1495 may manage power of the electronic device 1401. According to an embodiment, the power management module 1495 may include a power management integrated circuit (PMIC), a charger IC, a battery, or a fuel gauge. The PMIC may use a wired and/or wireless charging method. The wireless charging method may include a magnetic resonance method, a magnetic inducing method, or an electromagnetic method, and the PIMIC may include an additional circuit for wireless charging, such as a coil loop, a resonance circuit, or a rectifier. The indicator 1497 may display a state of the electronic device 1401 or a component of the electronic device 1401 (for example, the AP 1410), such as a booting state, a message state, or a charging state. The motor 1498 may convert an electric signal to a mechanical signal, and may generate a vibration effect or a haptic effect. Although not illustrated, the electronic device 1401 may further include a processing device (for example, a GPU) to support a mobile TV.

Each of technical components herein may be configured as one or more parts, and a name of the part may differ according to a type of an electronic device. According to some embodiments, the electronic device may include at least one component described here, wherein some component may be omitted or an additional component may be further included in the electronic device. Also, according to some embodiments, some of the components of the electronic device may be integrated together to form one entity and perform the same functions as those of the components before being integrated together.

Figure 15:
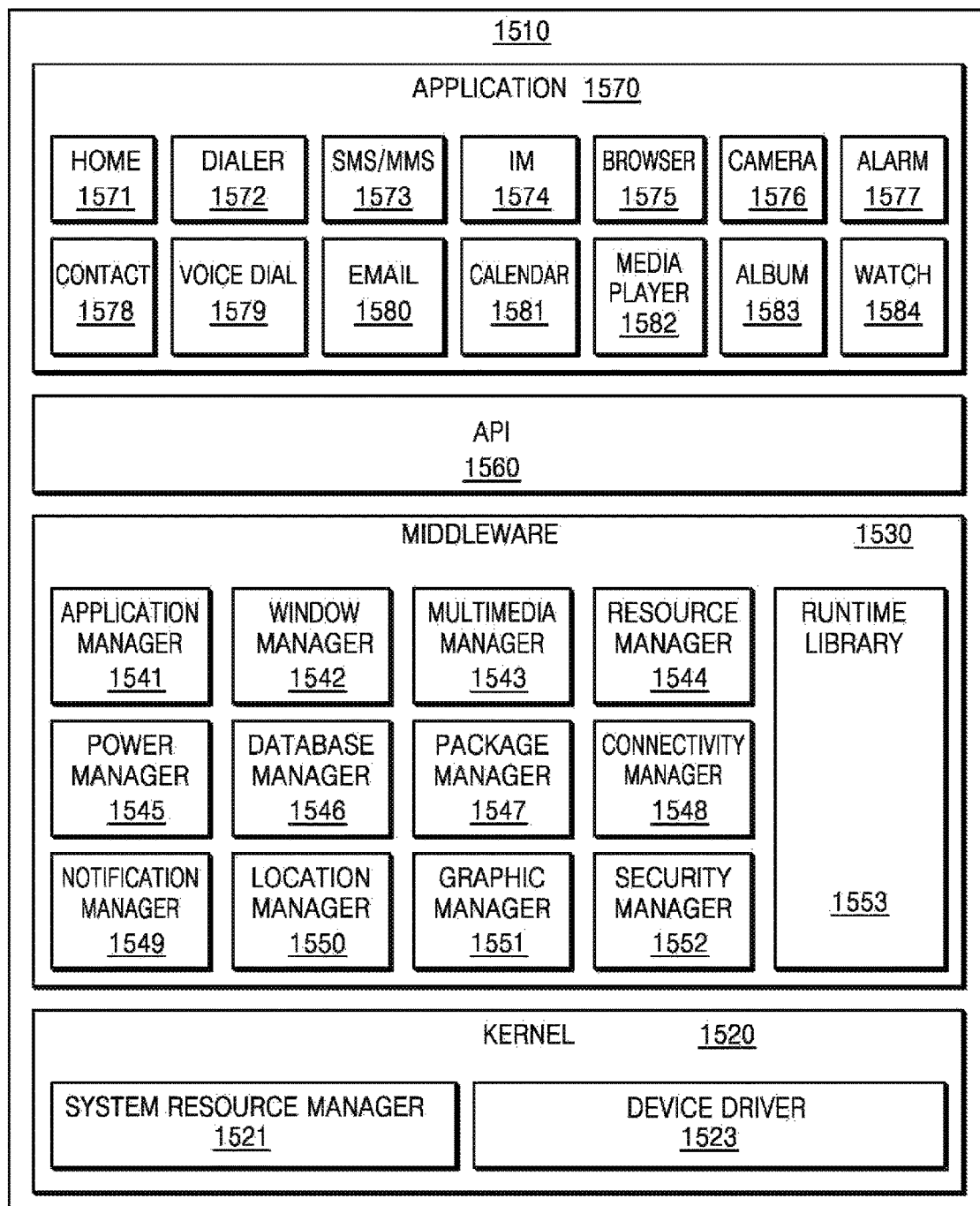
FIG. 15 is a block diagram illustrating an example program module according to some example embodiments.

FIG. 15 is a block diagram illustrating an example program module 1510 according to some example embodiments. According to an embodiment, the program module 1510 (for example, the program 240) may include an operating system (OS) controlling resources related to an electronic device (for example, the electronic device 100) and/or various applications (for example, the application program 247) driven on the OS. The OS may be, for example, Android, iOS, Windows, Symbian, Tizen, or Bada.

The program module 1510 may include a kernel 1520, a middleware 1530, an application programming interface (API) 1560, and/or an application 1570. At least a part of the program module 1510 may be pre-loaded on the electronic device or downloaded from an external electric device (for example, the first or second external electronic device 202 or 204, or the server 206).

The kernel 1520 (for example, the kernel 241) may include a system resource manager 1521 and/or a device driver 1523. The system resource manager 1521 may control, assign, or recover a system resource. According to an embodiment, the system resource manger 1521 may include a process manager, a memory manager, or a file system manager. The device driver 1523 may include, for example, a display driver, a camera driver, a Bluetooth driver, a shared memory driver, a USB driver, a keypad driver, a WiFi driver, an audio driver, or an inter-process communication (IPC) driver.

The middleware 1530 may provide a function commonly required by the application 1570 or may provide various functions to the application 1570 through the API 1560 such that the application 1570 efficiently uses system resources limited in an electronic device. According to an example embodiment, the middleware 1530 (for example, the middleware 243) may include at least one of a runtime library 1553, an application manger 1541, a window manager 1542, a multimedia manager 1543, a resource manager 1544, a power manager 1545, a database manager 1546, a package manager 1547, a connectivity manager 1548, a notification manager 1549, a location manager 1550, a graphic manager 1551, and a security manager 1552.

The middleware 1530 may include a middleware module forming a combination of various functions of the above components. The middleware 1530 may provide a specialized module according to types of OS to provide differentiated functions. Also, the middleware 1530 may dynamically delete some of the components or add a new component.

The API 1560 (for example, the API 245) is a group of API programming functions, and may be provided in a configuration different according to OS. For example, in case of Android or iOS, one API set may be provided according to platform, and in case of Tizen, at least two API sets may be provided according to platform.

The application 1570 (for example, the application program 247) may include at least one application capable of performing functions, such as a home function 1571, a dialer function 1572, short message service (SMS)/multimedia messaging service (MMS) function 1573, instant message function 1574, a browser function 1575, a camera function 1576, an alarm function 1577, a contact function 1578, a voice dial function 1579, an email function 1580, a calendar function 1581, a media player function 1582, an album function 1583, a watch function 1584, a health care function (for example, measuring an exercise amount or a blood sugar amount), and an environment information providing function (for example, atmospheric pressure, humidity, or temperature).

According to an embodiment, the application 1570 may include an application supporting information exchange between the electronic device (for example, the electronic device 100) and the external electronic device (for example, the first or second external electronic device 202 or 204) (hereinafter, referred to as an "information exchange application" for convenience of description). The information exchange application may include, for example, a notification relay application for transmitting certain information to the external electronic device or a device management application for managing the external electronic device.

According to an embodiment, the application 1570 may include an application (for example, a health management application of a mobile medical device) assigned according to attributes of the external electric device (for example, the first or second external electronic device 202 or 204). According to an embodiment, the application 1570 may include an application received from the external electronic device (for example, the server 206 or the first or second external electronic device 202 or 204). According to an embodiment, the application 1570 may include preloaded application or a third party application downloaded from a server. Names of the components of the program module 1510 may vary according to a type of OS.

According to some embodiments, at least a part of the program module 1510 may be realized in software, firmware, hardware, or a combination thereof. At least a part of the program module 1510 may be implemented (executed) by a processor, such as the AP 1410. At least a part of the program module 1510 may include a module, a program, a routine, a set of instructions, or a process to perform at least one function.

The term "module" used herein may denote a unit including one of or a combination of at hardware (e.g., circuitry), software, and firmware. The term "module" may be interchangeably used with the term a "unit", a "logic", a "logical block", a "component", or a "circuit". A "module" may be a minimum unit an integrally formed component or a part of the minimum unit. A "module" may be a minimum unit of performing at least one function or a part of the minimum unit. A "module" may be mechanically or electrically realized. For example, a "module" may include at least one of processing circuitry, an application-specific integrated circuit (ASIC) chip performing a certain operation, a field-programmable gate arrays (FPGAs), and a programmable-logic device, which are already known or are to be developed.

At least a part of a device (for example, modules or functions) or a method (for example, operations) according to some example embodiments may be realized as commands stored in a non-transitory computer-readable recording medium, in a form of a program module. When the commands are executed by at least one processor (for example, the processor 220), the at least one processor may perform a function corresponding to the commands. The non-transitory computer-readable recording medium may be the memory 230.

Examples of the non-transitory computer-readable recording medium include read-only memory (ROM), random-access memory (RAM), CD-ROMs, magnetic tapes, floppy disks, optical data storage devices, etc. Examples of the computer commands include codes prepared by a compiler, and high-level languages executable by a computer using an interpreter. The hardware device may be configured to operate as at least one software module to perform operations of the methods, or vice versa.

A non-transitory computer-readable recording medium having recorded thereon a program, which when executed by a computer, performs a method of controlling an electronic device including a plurality of image sensors including a first imaging sensor and a second imaging sensor, the method includes: outputting a first read control signal to the first imaging sensor and storing first data read from the first imaging sensor in a temporary memory; outputting a second read control signal to the second imaging sensor at a point of time later than the first read control signal and storing second data read from the second imaging sensor in the temporary memory; controlling a speed of outputting the first data and the second data stored in the temporary memory based on an output control signal, the speed of outputting being faster than a speed of reading the first data and the second data from the first and second imaging sensors to the temporary memory based on the first and second read control signals; and generating merged data obtained by merging the first data and the second data output from the temporary memory.

According to some example embodiments, an electronic device may efficiently store data read from a plurality of imaging sensors using small temporary memory capacity, and generate a composed image.

A module or a program module according to some example embodiments may include at least one of the above components, may not include some of the components, or may further include an additional element. Operations performed by a module, a program module, or another component according to some example embodiments may be performed sequentially, in parallel, repeatedly, or heuristically. Also, some of the operations may be performed in a different order or may not be performed, or another operation may be added.

It should be understood that example embodiments described herein should be considered in a descriptive sense only and not for purposes of limitation. Descriptions of features or aspects within each example embodiment should typically be considered as available for other similar features or aspects in other embodiments.

While one or more example embodiments have been described with reference to the figures, it will be understood by those of ordinary skill in the art that various changes in form and details may be made therein without departing from the spirit and scope as defined by the following claims.

What is claimed is:

1. An electronic device comprising:
   a plurality of image sensors comprising a first imaging sensor and a second imaging sensor; and
   a processor electrically connected to the plurality of imaging sensors and configured to output a read control signal and a synchronization signal to the plurality of imaging sensors,
   wherein the processor is further configured to:
   output a first read control signal to the first imaging sensor and store first data read from the first imaging sensor in a temporary memory,
   output a second read control signal to the second imaging sensor at a point of time later than the first read control signal and additionally store second data read from the second imaging sensor in the temporary memory,
   control a speed of outputting the first and second data stored in the temporary memory to the processor based on an output control signal, the speed of said outputting the first and second data from the temporary memory to the processor being faster than a speed of reading the first and second data from the first and second imaging sensors to the temporary memory based on the first and second read control signals, and
   generate merged data by merging the first data and the second data output from the temporary memory.

2. The electronic device of claim 1, wherein the temporary memory and the processor are separately provided inside the electronic device.

3. The electronic device of claim 1, wherein the first data comprises data generable in one horizontal axis line from among pixels included in the first imaging sensor, the second data comprises data generable in one horizontal axis line from among pixels included in the second imaging sensor, and the temporary memory comprises a space for storing data of a size corresponding to halves of the first data and the second data.

4. The electronic device of claim 3, wherein the processor is further configured to merge the one horizontal axis line from among the pixels included in the first data and the one horizontal axis line from among the pixels included in the second data into one horizontal axis line.

5. The electronic device of claim 1, wherein the speed of outputting the first and second data stored in the temporary memory is at least two times faster than the speed of reading the first and second data from the first and second imaging sensors to the temporary memory.

6. The electronic device of claim 1, wherein the processor is further configured to determine a time difference between outputting of the first read control signal and outputting of the second read control signal based on at least one of a number of the plurality of image sensors and a data output speed of the temporary memory.

7. The electronic device of claim 1, wherein the first imaging sensor is included in a first imaging sensor module having a view angle of 180° and the second imaging sensor is included in a second imaging sensor module having a view angle of 180°, and
   the processor is further configured to generate an image having a view angle of 360° by merging an image generated by the first imaging sensor of the first imaging sensor module and an image generated by the second imaging sensor of the second imaging sensor module.

8. The electronic device of claim 1, wherein the plurality of imaging sensors further comprises a third imaging sensor and a fourth imaging sensor, and
   the processor is further configured to:
   output a third read control signal to the third imaging sensor at a point of time later than the second read control signal, and additionally store third data read from the third imaging sensor in the temporary memory,
   output a fourth read control signal to the fourth imaging sensor at a point of time later than the third read control signal, and additionally store fourth data read from the fourth imaging sensor in the temporary memory, and
   output merged data obtained by merging the first data, the second data, the third data, and the fourth data stored in the temporary memory based on an output control signal, wherein the speed of outputting is faster than a speed of reading of the first through fourth data based on the first through fourth read control signals.

9. The electronic device of claim 8, wherein the first data, the second data, the third data, and the fourth data comprise data generable in one horizontal axis line from among pixels included respectively in the first through fourth imaging sensors, and
   the temporary memory comprises a space for storing data of a size corresponding to ¾ of each of the first data, the second data, the third data, and the fourth data.

10. The electronic device of claim 9, wherein the processor is further configured to merge the one horizontal axis line from among the pixels included in the first data, the one horizontal axis line from among the pixels included in the second data, the one horizontal axis line from among the pixels included in the third data, and the one horizontal axis line from among the pixels included in the fourth data into one horizontal axis line.

11. The electronic device of claim 8, wherein the speed of outputting the first data, the second data, the third data, and the fourth data stored in the temporary memory based on the output control signal is at least four times faster than the speed of reading data from the plurality of imaging sensors to the temporary memory based on the first through fourth read control signals.

12. The electronic device of claim 8, wherein the processor is further configured to determine time differences between outputting of the first read control signal, outputting of the second read control signal, outputting of the third read control single, and outputting of the fourth read control signal based on at least one of a number of the plurality of image sensors and a data output speed of the temporary memory.

13. A method of controlling an electronic device comprising a plurality of image sensors comprising a first imaging sensor and a second imaging sensor, the method comprising:
   outputting a first read control signal to the first imaging sensor and storing first data read from the first imaging sensor in a temporary memory;
   outputting a second read control signal to the second imaging sensor at a point of time later than the first read control signal and storing second data read from the second imaging sensor in the temporary memory;
   controlling a speed of outputting the first data and the second data stored in the temporary memory to a processor based on an output control signal, the speed of the outputting being faster than a speed of reading the first data and the second data from the first and second imaging sensors to the temporary memory based on the first and second read control signals; and
   generating merged data obtained by merging the first data and the second data output from the temporary memory.

14. The method of claim 13, wherein the first data comprises data generable in one horizontal axis line from among pixels included in the first imaging sensor and the second data comprises data generable in one horizontal axis line from among pixels included in the second imaging sensor, and
   the temporary memory comprises a space for storing data of a size corresponding to halves of the first data and the second data.

15. The method of claim 14, wherein the generating of the merged data comprises merging the one horizontal axis line from among the pixels included in the first data and the one horizontal axis line from among the pixels included in the second data into one horizontal axis line.

16. The method of claim 13, wherein the speed of outputting the first data and the second data stored in the temporary memory is at least two times faster than the speed of reading the first data and the second data from the first and second imaging sensor to the temporary memory.

17. The method of claim 13, wherein a time difference between outputting of the first read control signal and outputting of the second read control signal is determined based on at least one of a number of the plurality of imaging sensors and a data output speed of the temporary memory.

18. A non-transitory computer-readable recording medium having recorded thereon a program, which when executed by a computer, performs a method of controlling an electronic device comprising a plurality of image sensors including a first imaging sensor and a second imaging sensor, the method comprising:
   outputting a first read control signal to the first imaging sensor and storing first data read from the first imaging sensor in a temporary memory;
   outputting a second read control signal to the second imaging sensor at a point of time later than the first read control signal and storing second data read from the second imaging sensor in the temporary memory;
   controlling a speed of outputting the first data and the second data stored in the temporary memory to a processor based on an output control signal, the speed of the outputting being faster than a speed of reading the first data and the second data from the first and second imaging sensors to the temporary memory based on the first and second read control signals; and
   generating merged data obtained by merging the first data and the second data output from the temporary memory.

* * * * *